United States Patent
Powell et al.

(10) Patent No.: US 9,659,138 B1
(45) Date of Patent: May 23, 2017

(54) METHODS, SYSTEMS, AND COMPUTER PROGRAM PRODUCT FOR A BOTTOM-UP ELECTRONIC DESIGN IMPLEMENTATION FLOW AND TRACK PATTERN DEFINITION FOR MULTIPLE-PATTERNING LITHOGRAPHIC TECHNIQUES

(71) Applicant: CADENCE DESIGN SYSTEMS, INC., San Jose, CA (US)

(72) Inventors: Giles V. Powell, Alameda, CA (US); Alexandre Arkhipov, San Jose, CA (US); Roland Ruehl, San Carlos, CA (US); Karun Sharma, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 230 days.

(21) Appl. No.: 14/675,609

(22) Filed: Mar. 31, 2015

(51) Int. Cl.
G06F 17/50 (2006.01)

(52) U.S. Cl.
CPC ...... *G06F 17/5081* (2013.01); *G06F 17/5072* (2013.01); *G06F 17/5068* (2013.01); *G06F 2217/12* (2013.01)

(58) Field of Classification Search
None
See application file for complete search history.

(56) References Cited

U.S. PATENT DOCUMENTS

| | | |
|---|---|---|
| 5,598,343 A | 1/1997 | Roy |
| 5,793,643 A | 8/1998 | Cal |
| 6,230,304 B1 | 5/2001 | Groeneveld |
| 6,664,638 B2 | 12/2003 | Ushiyama |
| 7,191,425 B1 | 3/2007 | Malik |
| 7,378,195 B2 | 5/2008 | Graur |
| 8,219,939 B2 | 7/2012 | Schultz |
| 8,225,239 B2* | 7/2012 | Reed ............... G06F 17/5068 716/122 |
| 8,316,326 B1 | 11/2012 | Pierrat |
| 8,418,111 B2* | 4/2013 | Chen ............... G06F 17/5077 716/119 |
| 8,448,102 B2* | 5/2013 | Kornachuk ...... G06F 17/5068 716/118 |

(Continued)

OTHER PUBLICATIONS

Non-Final Office Action dated Aug. 11, 2016 for U.S. Appl. No. 14/292,067.

(Continued)

*Primary Examiner* — Leigh Garbowski
(74) *Attorney, Agent, or Firm* — Vista IP Law Group, LLP

(57) ABSTRACT

Disclosed are techniques for implementing parallel fills for bottom-up electronic design implementation flow and track pattern definition for multiple-patterning lithographic processing. These techniques identify a canvas in a layout and design rules for track patterns and multiple-patterning, where the canvas is not yet associated with any base track patterns. A first shape having the first width is inserted along a first track in the canvas based on the design rules. A custom, legal track pattern is generated by arranging multiple tracks in an order and further by associating the first width with the first track in the custom, legal track pattern. The layout may then be further modified by guiding the insertion of one or more additional shapes with the custom, legal track pattern.

20 Claims, 17 Drawing Sheets

(56) References Cited

U.S. PATENT DOCUMENTS

| | | | | |
|---|---|---|---|---|
| 8,494,760 B2* | 7/2013 | Yoel | ............... | G08G 5/0021 |
| | | | | 701/301 |
| 8,607,183 B2 | 12/2013 | Miezner | | |
| 8,701,056 B1 | 4/2014 | Friedberg | | |
| 8,707,223 B2 | 4/2014 | Blatchford | | |
| 8,739,095 B2* | 5/2014 | Cao | ............... | G06F 17/50 |
| | | | | 716/111 |
| 8,782,570 B1 | 7/2014 | Li | | |
| 8,799,835 B2* | 8/2014 | Bendicksen | ....... | G06F 17/5081 |
| | | | | 716/102 |
| 8,843,867 B2* | 9/2014 | Chase | ............. | G06F 17/5081 |
| | | | | 716/111 |
| 8,871,104 B2* | 10/2014 | Park | ............... | H01L 21/0337 |
| | | | | 216/41 |
| 8,918,745 B2 | 12/2014 | Wang | | |
| 8,954,913 B1 | 2/2015 | Yuan | | |
| 8,959,466 B1* | 2/2015 | Hsu | ............... | G06F 17/5068 |
| | | | | 716/122 |
| 8,984,465 B1* | 3/2015 | Salowe | ........... | G06F 17/5072 |
| | | | | 716/122 |
| 9,003,349 B1* | 4/2015 | Salowe | ........... | G06F 17/5077 |
| | | | | 703/16 |
| 9,117,052 B1* | 8/2015 | Salowe | ........... | G06F 17/5077 |
| 9,141,751 B2* | 9/2015 | Lee | ............... | G06F 17/5081 |
| 9,158,883 B2 | 10/2015 | Peng | | |
| 9,158,885 B1 | 10/2015 | Gray | | |
| 9,245,082 B2* | 1/2016 | Birch | ............. | G06F 17/5077 |
| 9,251,299 B1* | 2/2016 | Salowe | ........... | G06F 17/50 |
| 9,335,624 B2 | 5/2016 | Lee | | |
| 9,372,952 B1 | 6/2016 | Sun | | |
| 9,372,955 B1* | 6/2016 | Lee | ............... | G06F 17/5081 |
| 9,396,301 B1* | 7/2016 | Lee | ............... | G06F 17/5077 |
| 2002/0069396 A1 | 6/2002 | Bhattacharya | | |
| 2003/0005399 A1 | 1/2003 | Igarashi | | |
| 2008/0028352 A1 | 1/2008 | Birch et al. | | |
| 2011/0014786 A1 | 1/2011 | Sezginer | | |
| 2014/0040847 A1 | 2/2014 | Milinichik | | |
| 2014/0145342 A1* | 5/2014 | Schultz | ........... | H01L 21/31144 |
| | | | | 257/773 |
| 2015/0234974 A1* | 8/2015 | Dechene | ........... | G03F 7/70433 |
| | | | | 716/52 |

OTHER PUBLICATIONS

Notice of Allowance dated Feb. 8, 2015 for U.S. Appl. No. 14/292,122.
Final Office Action dated Oct. 28, 2015 for U.S. Appl. No. 14/292,166.
Non-Final Office Action dated May 28, 2015 for U.S. Appl. No. 14/292,166.
Notice of Allowance dated Mar. 15, 2016 for U.S. Appl. No. 14/292,166.
Non-Final Office Action dated Mar. 21, 2016 for U.S. Appl. No. 14/318,488.
Notice of Allowance dated Sep. 21, 2016 for U.S. Appl. No. 14/318,488.
Final Office Action dated Oct. 27, 2016 for U.S. Appl. No. 14/231,688.
Non-Final Office Action dated Mar. 29, 2016 for U.S. Appl. No. 14/231,688.
Non-Final Office Action dated Jul. 28, 2016 for U.S. Appl. No. 14/675,426.
Notice of Allowance dated Jan. 11, 2017 for U.S. Appl. No. 14/675,426.
Non-Final Office Action dated Feb. 27, 2017 for U.S. Appl. No. 14/675,516.

* cited by examiner

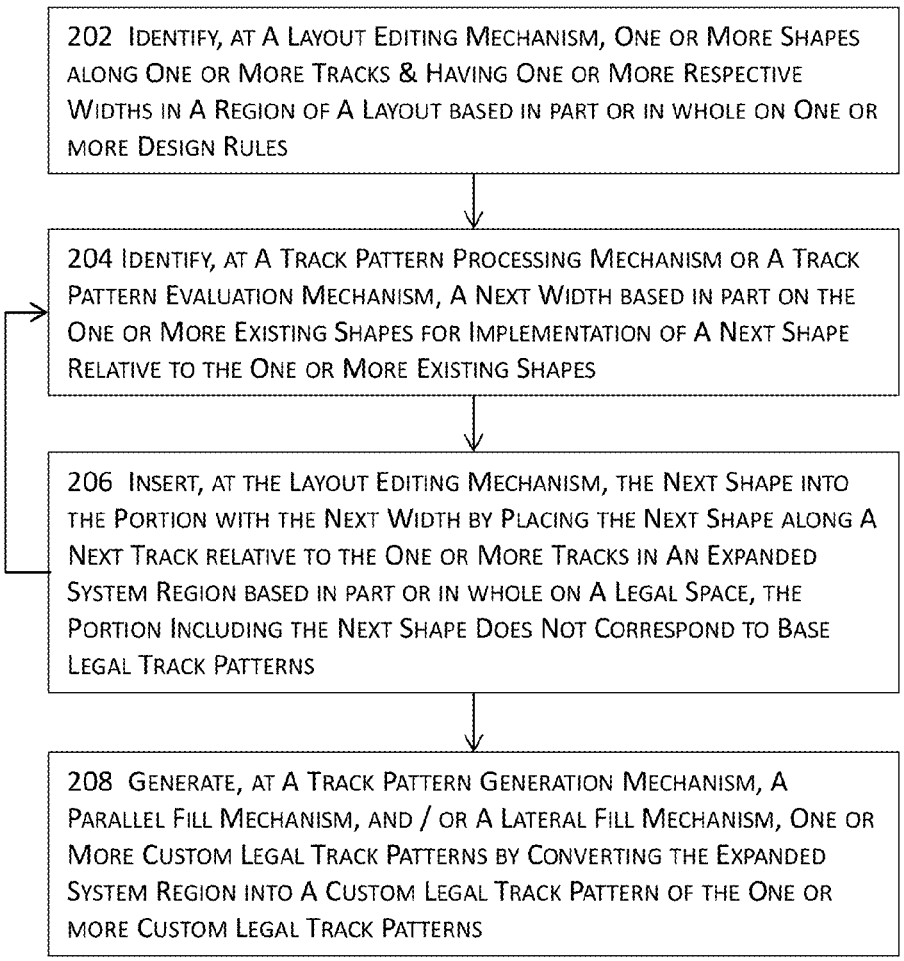

202 IDENTIFY, AT A LAYOUT EDITING MECHANISM, ONE OR MORE SHAPES ALONG ONE OR MORE TRACKS & HAVING ONE OR MORE RESPECTIVE WIDTHS IN A REGION OF A LAYOUT BASED IN PART OR IN WHOLE ON ONE OR MORE DESIGN RULES

204 IDENTIFY, AT A TRACK PATTERN PROCESSING MECHANISM OR A TRACK PATTERN EVALUATION MECHANISM, A NEXT WIDTH BASED IN PART ON THE ONE OR MORE EXISTING SHAPES FOR IMPLEMENTATION OF A NEXT SHAPE RELATIVE TO THE ONE OR MORE EXISTING SHAPES

206 INSERT, AT THE LAYOUT EDITING MECHANISM, THE NEXT SHAPE INTO THE PORTION WITH THE NEXT WIDTH BY PLACING THE NEXT SHAPE ALONG A NEXT TRACK RELATIVE TO THE ONE OR MORE TRACKS IN AN EXPANDED SYSTEM REGION BASED IN PART OR IN WHOLE ON A LEGAL SPACE, THE PORTION INCLUDING THE NEXT SHAPE DOES NOT CORRESPOND TO BASE LEGAL TRACK PATTERNS

208 GENERATE, AT A TRACK PATTERN GENERATION MECHANISM, A PARALLEL FILL MECHANISM, AND / OR A LATERAL FILL MECHANISM, ONE OR MORE CUSTOM LEGAL TRACK PATTERNS BY CONVERTING THE EXPANDED SYSTEM REGION INTO A CUSTOM LEGAL TRACK PATTERN OF THE ONE OR MORE CUSTOM LEGAL TRACK PATTERNS

FIG. 2

METHODS, SYSTEMS, AND COMPUTER PROGRAM PRODUCT FOR A BOTTOM-UP ELECTRONIC DESIGN IMPLEMENTATION FLOW AND TRACK PATTERN DEFINITION FOR MULTIPLE-PATTERNING LITHOGRAPHIC TECHNIQUES

CROSS REFERENCE TO RELATED APPLICATIONS

This application is related to U.S. patent application Ser. No. 14/292,067 entitled "METHOD, SYSTEM, AND COMPUTER PROGRAM PRODUCT FOR IMPLEMENTING TRACK PATTERNS FOR ELECTRONIC CIRCUIT DESIGNS" and filed on May 30, 2014, U.S. patent application Ser. No. 14/292,122 entitled "METHOD, SYSTEM, AND COMPUTER PROGRAM PRODUCT FOR IMPLEMENTING REPETITIVE TRACK PATTERNS FOR ELECTRONIC CIRCUIT DESIGNS" and filed on May 30, 2014, U.S. patent application Ser. No. 14/292,166 entitled "METHOD, SYSTEM, AND COMPUTER PROGRAM PRODUCT FOR INTERCONNECTING CIRCUIT COMPONENTS WITH TRACK PATTERNS FOR ELECTRONIC CIRCUIT DESIGNS" and filed on May 30, 2014, U.S. patent application Ser. No. 14/318,488 entitled "METHOD, SYSTEM, AND COMPUTER PROGRAM PRODUCT FOR CHECKING OR VERIFYING SHAPES IN TRACK PATTERNS FOR ELECTRONIC CIRCUIT DESIGNS" and filed on Jun. 27, 2014, U.S. patent application Ser. No. 14/675,516 entitled "METHODS, SYSTEMS, AND COMPUTER PROGRAM PRODUCT FOR IMPLEMENTING DRC CLEAN MULTI-PATTERNING PROCESS NODES WITH LATERAL FILLS IN ELECTRONIC DESIGNS", and U.S. patent application Ser. No. 14/675,426 entitled "METHODS, SYSTEMS, AND COMPUTER PROGRAM PRODUCT FOR IMPLEMENTING DRC CLEAN MULTI-PATTERNING PROCESS NODES WITH PARALLEL FILLS IN ELECTRONIC DESIGNS". The contents of the aforementioned U.S. patent applications are hereby expressly incorporated by reference in their entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Foundries often restrict electronic design implementations to a limited number of routing track arrangements, each of which may only take on interconnect segments having width values from a discrete set of legal widths that may be made available in the process Design Rule Manual (DRM) in an effort accommodate complex design rules for advanced process nodes (e.g., 14-nm, 10-nm or below). Furthermore, in order to facilitate multiple-patterning lithographic processes (e.g., SADP or self-aligned double-patterning, SATP or self-aligned triple patterning, LELELE or lithography-etch-lithography-etch-lithography-etch, etc.), foundries may further impose additional constraints on the availability of wire widths that are associated with routing tracks. For example, after a first routing track is chosen and assigned a mask color (e.g. B for Blue) for a particular interconnect segment having a specific width, the next routing track may need to be assigned a different color (e.g., C for Cyan), and may only accept a wire having one of a discrete set of legal width values, where the discrete set of legal width values is in turn a function of the legal width associated with the preceding B routing track.

An electronic design may thus correspond to and include about, for example, a dozen different wire widths, and the routing tracks for routing the electronic design may thus be associated with as many legal widths. Any attempt to manually figure out which routing track associated with a permissible width can immediately neighbor another routing track associated with another permissible width is nearly impossible due to the sheer number of different possible legal combinations of routing tracks, especially in light of the extremely complex design rules that govern what track patterns are deemed legal. Therefore, generating a legal track pattern including a plurality of tracks associated with some legal widths is nearly impossible to be performed manually, especially when an electronic design includes more than just a handful of legal or permissible widths. Repetitive track patterns may further exacerbate the complexity in that each track pattern needs to comply with governing design rules and constraints for track patterns, and the repetitive track patterns as a whole also needs to comply with the same set of governing design rules and constraints. Any additions or removal of one or more tracks to a track pattern may propagate throughout the repetitive track patterns, even if a single track pattern may comply with all the pertinent design rules and constraints.

The interplay among complex design rules, the permissible, legal track patterns, and the addition, removal, or modification of an existing design component further complicates the solution finding process to an inextricable extent. A track pattern may be deemed legal if the group of one or more routing tracks in the track pattern complies with various design rules governing which arrangements or sequences of routing track associated with their respective widths are permitted. For example, a design may prohibit arranging a thin wire segment having a width of w1 immediately adjacent to a thick or fat wire segment having a width of w2 in any track pattern. Given this design rule, any track patterns having such an arrangement of two immediately neighboring tracks associated with w1 with w2 violate this design rule and will thus be considered illegal. During the physical design implementation stage, a change may be introduced into an electronic design by, for example, adding, removing, or modifying one or more shapes (e.g., wire segments) in a region of an electronic design. Such a change may be introduced manually by a designer during an interactive editing session or by an electronic design automation (EDA) tool. For example, a designer may insert a second metal shape on a second routing track in a region of an electronic design. The insertion of the second metal shape may leave an unoccupied space between the second metal shape and a preexisting first metal shape implemented along a first routing track.

Assuming the distance between the first metal shape and the second metal shape is the fill distance, the goal is then to find positive definite solutions to a linear Diophantine equation. Depending upon the number of permissible wire widths and the spacing values in an electronic design, the linear Diophantine equation may be solved by using combinatorial optimization techniques such as those used to solve the Knapsack problem in some embodiments. Some other embodiments may utilize a static, predetermined dictionary including permissible legal track patterns that may be looked up for the region at issue. A set of legal track patterns may be identified by considering, for example, the widths of the first shape and the second shape and the fill distance.

Therefore, there exists a need for a method, system, and computer program product for implementing DRC (design rule check) clean multi-patterning process nodes with parallel fills in electronic designs.

SUMMARY

Disclosed are method(s), system(s), and article(s) of manufacture for a bottom-up electronic design implementation flow and track pattern definition for multiple-patterning lithographic techniques in various embodiments. Some first embodiments are directed at a method for a bottom-up electronic design implementation flow and track pattern definition for multiple-patterning lithographic techniques.

In these first embodiments, a canvas of a layout and one or more design rules may be identified for track patterns and multiple patterning, and a first shape may be inserted into the canvas by implementing the first shape with a first width along a first track in the canvas based in part or in whole upon the one or more design rules. Upon insertion of the first shape into the canvas, the canvas including the first shape does not correspond to base legal track patterns provided in a base set of legal track patterns. The method may further include the act of generating, at a track pattern processing and generation mechanism coupled with the at least one micro-processor of the computing system, a custom, legal track pattern by arranging a plurality of tracks in an order and by associating at least the first width with the first track and the act of modifying the layout by guiding an insertion of one or more additional shapes with the custom, legal track pattern.

In some of these first embodiments, a system region for the first shape may be generated, wherein the one or more design rules determine legality of track patterns in the layout and fabrication of the layout with multiple patterning lithographic techniques and add at least the first track to the system region, wherein the canvas includes zero or more existing shapes. In some of the immediately preceding embodiments, a list of legal widths for a second shape may be determined based in part or in whole upon the first width and identify a second width from the list of legal widths for a second shape by selecting the second width from the list of legal width, the second shape to be inserted into the canvas. In addition or in the alternative, a legal space for guiding insertion of the second shape into the canvas may be dynamically determined based in part or in whole upon the first width of the first shape and the second width of the second shape. In some of these first embodiments, the legal space defines a track pattern region between the first track and a second track for the second shape in which one or more legal solutions for at least one legal track pattern is found, and the at least one legal track pattern includes a permissible arrangement of at least the first track, the track pattern region including at least one additional track, and the second track in a permissible order.

In some of these first embodiments, a location for inserting the second shape may be identified by determining the location with the legal space as a guide, and it may be determined whether or not the location is overridden by examining a final location of the second shape against the legal space. In some of these immediately preceding embodiments, an implementation scheme may be modified for the second shape by identifying another legal width from the list of legal widths or altering a minimum number of tracks in the custom, legal track pattern. Optionally, the second shape may be incrementally implemented in the canvas by inserting the second shape having the second width at the location or the final location along a second track, and the system region may be incrementally modified by expanding the system region into an expanded system region to accommodate at least the first shape and the second shape. In some of these immediately preceding embodiments, it may be determined whether or not an arrangement of the first track, a space between the first track and the second track, and the second track matches one or more base legal track patterns in the base set, and the method may further implement the layout by inserting one or more additional shapes with the one or more base legal track patterns in the base set when the arrangement is determined to match the one or more base legal track patterns.

In addition or in the alternative, the expanded system region may be updated to include the second track for the second shape in the expanded system region, and the custom, legal track pattern may be modified into an incrementally modified custom, legal track pattern by converting the expanded system region into the custom, legal track pattern or by assembling the second track into the custom, legal track pattern. In some embodiments, the modified, custom legal track pattern may be modified by comparing one or more track pattern characteristics to one or more corresponding base legal track patterns in the base set and redundancy removal may be performed by discarding the modified, custom legal track pattern when the modified, custom legal track pattern is determined to match a base legal track pattern in the base set. In addition or in the alternative, a first plurality of shapes in a first region of the layout and one or more first characteristics of the first plurality of shapes may be identified. The one or more first legal track patterns for the plurality of shapes may be further optionally determined, and the one or more first legal track patterns may be examined by comparing at least one of the one or more first characteristics of the first plurality of shapes to at least one of the one or more track pattern characteristics to determine whether or not no matching track patterns are found. In these embodiments, at least one of the one or more first track patterns may be stored or exported the at least one of the one or more first track patterns to a central repository for collaboration on the layout or on one or more other layouts. In some of the first embodiments, the custom, legal track pattern may be identified with a track pattern identification, which may be associated with the canvas, and the track pattern identification may be dynamically modified based on a progress of implementation of the layout Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of a track pattern processing mechanism, an implementation option processing mechanism, a parallel fill mechanism, a legal width generation mechanism, a design traversal mechanism, a legal space and system region generation mechanism, a track pattern evaluation & generation mechanism, and/or a post-layout operation mechanism in some embodiments.

Each of these mechanisms may include or function in tandem with electrical circuitry and one or more microprocessors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing three-dimensional operations for electronic designs are described below with reference to FIGS. 1-6.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4A-1 illustrates a simplified scenario where two wire segments are spaced at a distance that is different from and thus violates the constant spacing rule in some embodiments.

FIG. 4A-2 illustrates a simplified scenario where two wire segments are spaced at a distance that is different from and thus violates the constant spacing rule in some embodiments.

FIGS. 5A-I illustrate an example of the application of some techniques described herein for a bottom-up electronic design implementation flow and track pattern definition for multiple-patterning lithographic techniques in some embodiments.

DETAILED DESCRIPTION

Figure 1:
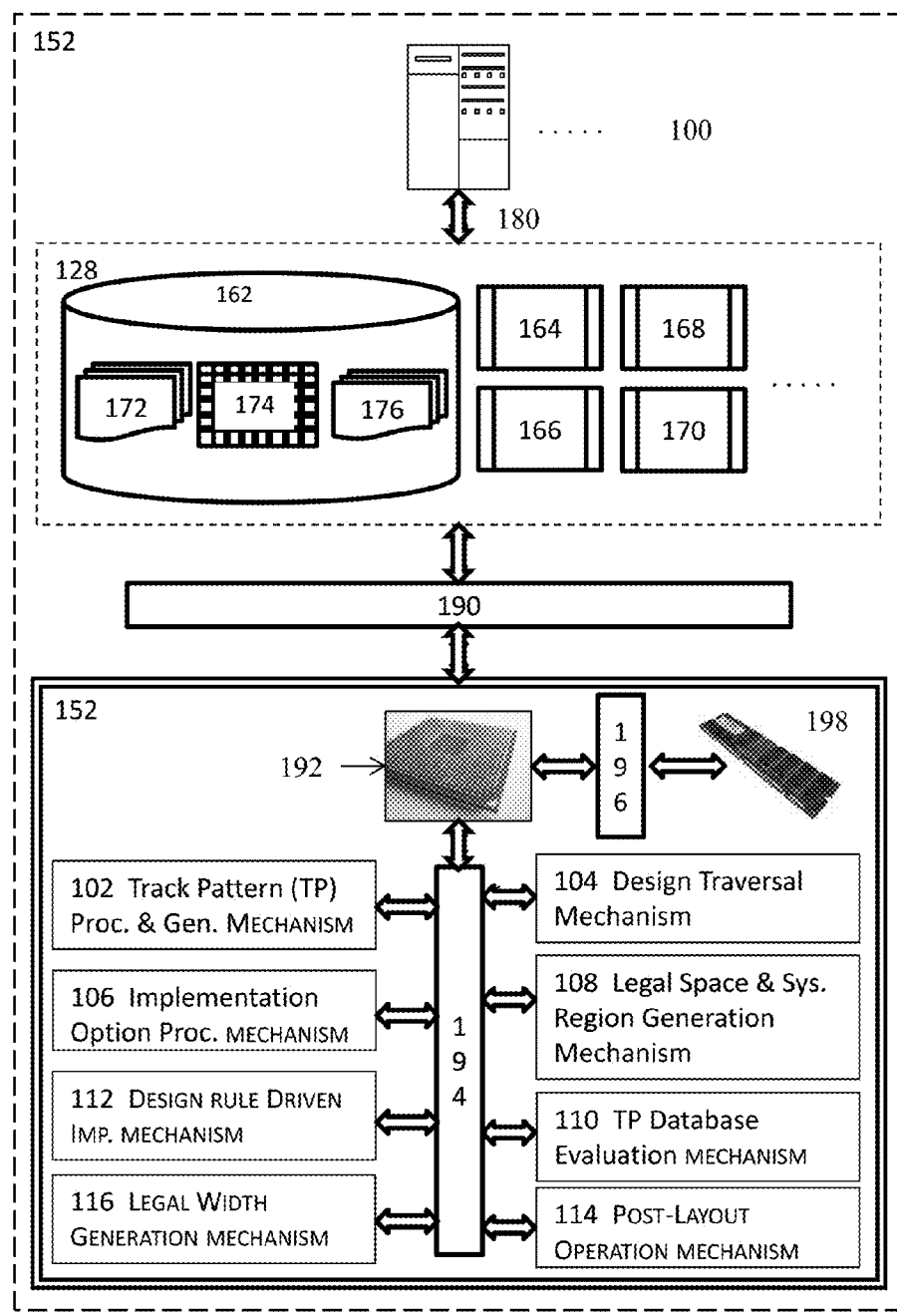
FIG. 1 illustrates a high level block diagram of an electronic design automation system for a bottom-up electronic design implementation flow and track pattern definition for multiple-patterning lithographic techniques in one or more embodiments.
Figure 3A:
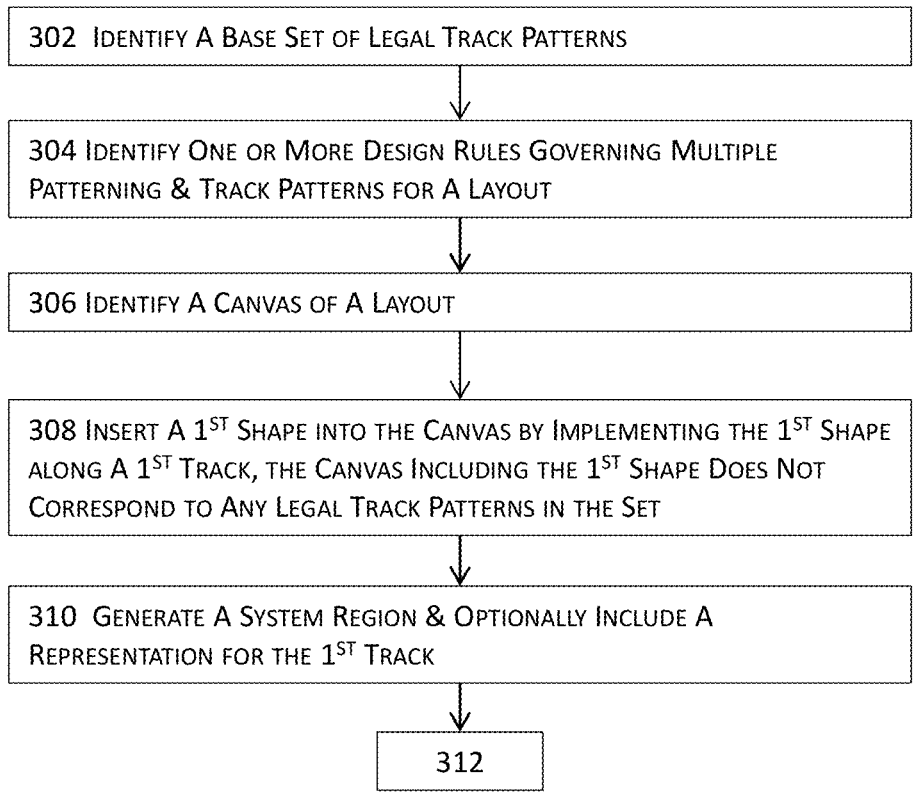
FIGS. 3A-D jointly illustrate a more detailed block diagram for a bottom-up electronic design implementation flow and track pattern definition for multiple-patterning lithographic techniques in one or more embodiments.
Figure 3B:
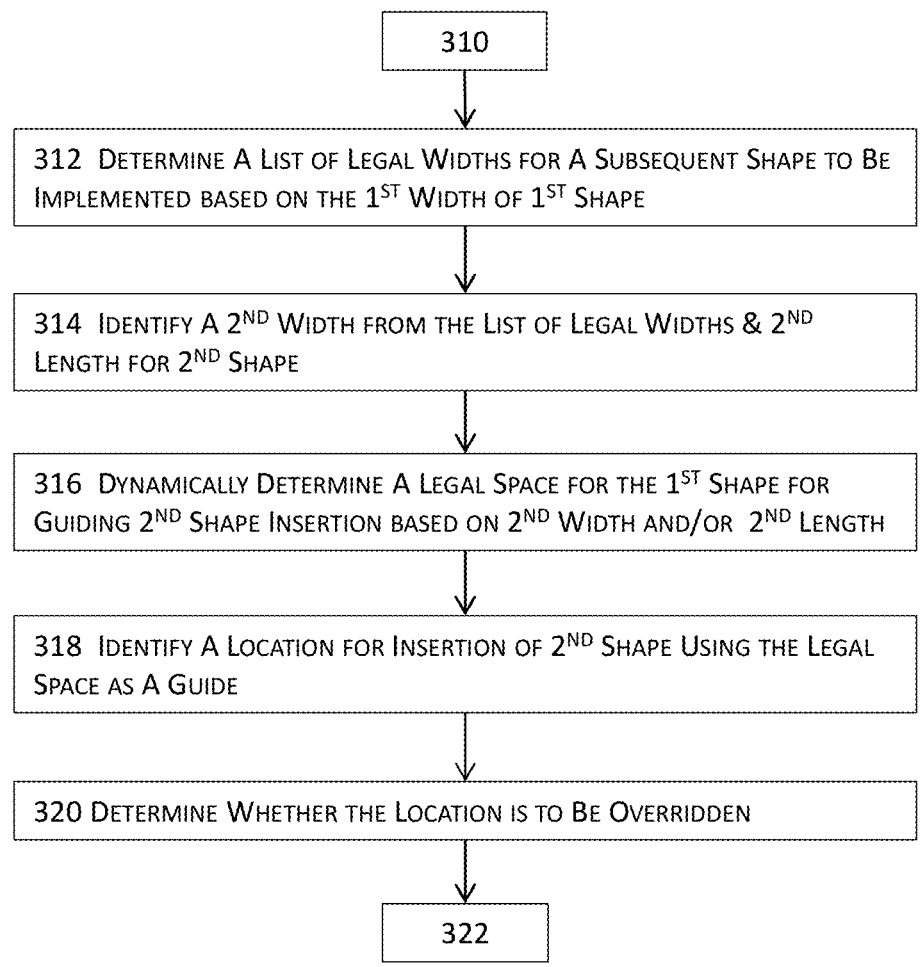
Figure 3C:
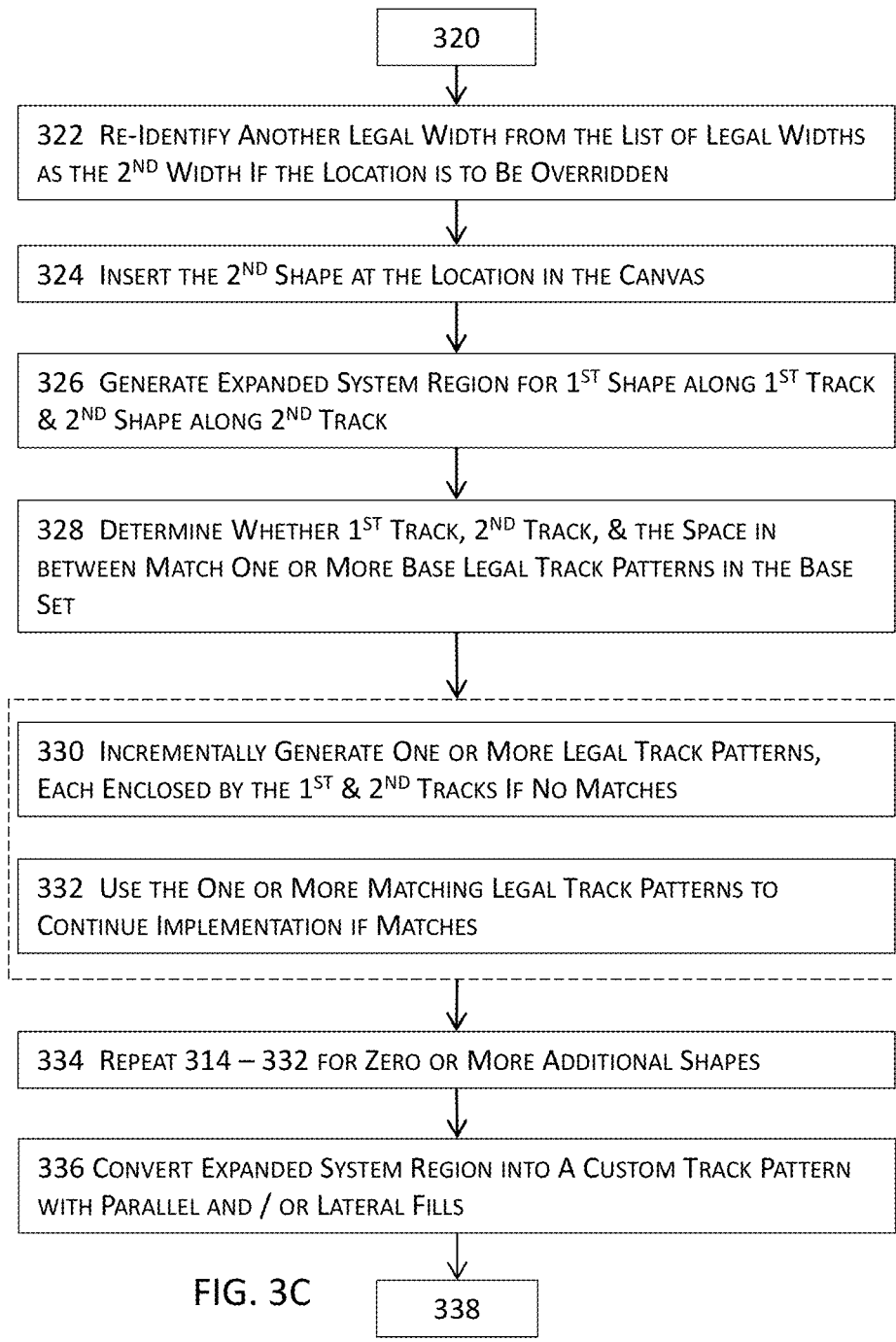
Figure 3D:
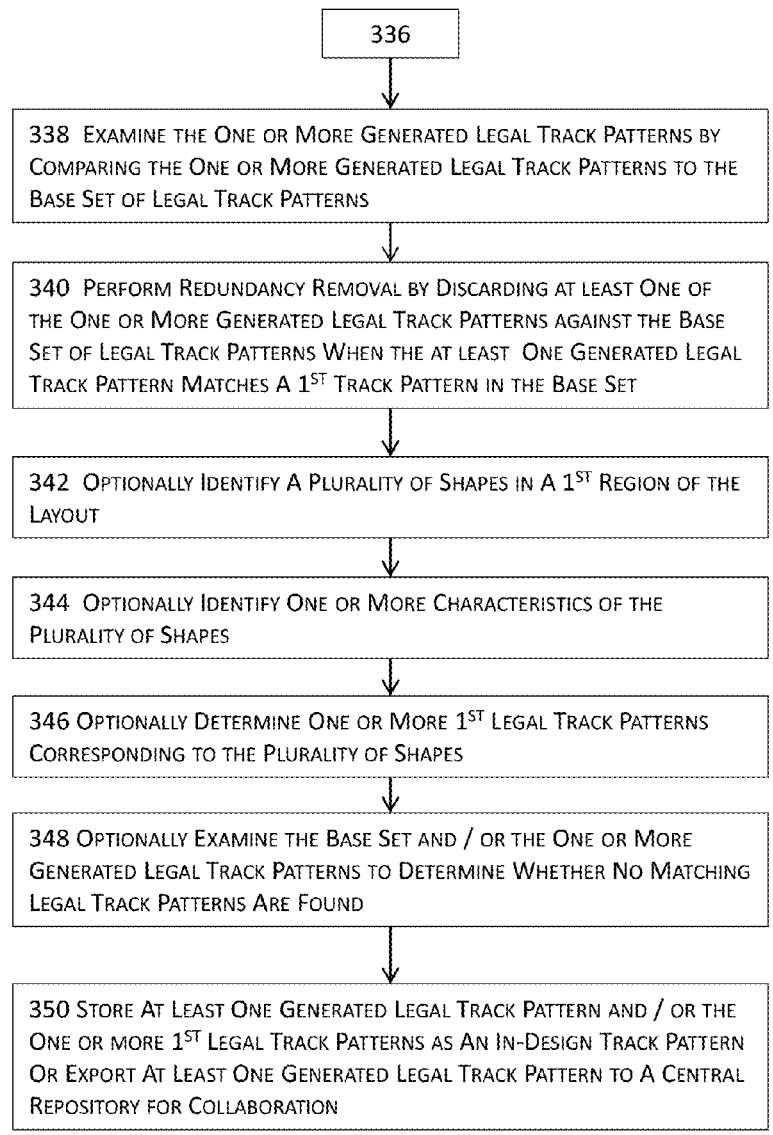

Various embodiments are directed to a method, system, and computer program product for implementing electronic design layouts with symbolic representations. Other objects, features, and advantages of the invention are described in the detailed description, figures, and claims.

One or more embodiments are directed at a constraint-based layout implementation methodology that automatically generates or fixes a layout while complying with multiple-patterning design rules or constraints. Given a set of constraints or design rules, the techniques described herein determine multiple slices for a region of a layout by orthogonally projecting the ends of some or all existing shapes in the region onto a reference line. The projection lines passing through end points of shapes may be termed as slice lines. A slice may thus be determined as the subdivided area between two immediately neighboring slice lines. As a result, the slice lines for a region including horizontal shapes include a set of vertical lines, and the slice lines for a region including vertical shapes include a set of horizontal lines.

With the slice lines and slices determined, design rules or constraints that operate upon two-dimensional geometries (e.g., rectangular segments or shapes) may be transformed into one-dimensional geometries. For example, checking whether two adjacent shapes along a routing track meet the spacing design rule may require access to the design database including the design data for these two two-dimensional shapes in conventional approaches. By projecting the end points of shapes along a reference line, the shapes are effectively mapped from the two-dimensional space to the one-dimensional space. In addition, the corresponding design rules or constraints may also be similarly transformed such that in checking whether these transformed design rules or constraints are satisfied, the EDA tool only need to operate upon the design data with reduced dimensionality (e.g., one-dimensional data for the end points).

The existing shapes in the region may also be categorized or classified into a plurality of categories based at in part or in whole upon the modifiability of each of these existing shapes. The plurality of categories may include, for example, fixed geometries, sizable geometries, one-side sizable geometries, and free geometries. More details about each of these categories are described below. The EDA tool may thus determine whether or not the shapes in an electronic design meet the governing design rules or constraints. With the sliced lines and slices, the EDA tool only need to operate on design data having reduced dimensionality in view of the transformed design rules or constraints and thus may identify any violations in a faster and more efficient manner. In the event that modifications to one or more shapes are desired or required (e.g., a violation of a design rule has occurred or an optimization criterion requires or desires modifications to certain shapes), the EDA tool may identify the shapes of interest (e.g., shapes that cause the violation) and their respective categories or classes and perform the fixes upon the shapes that are amenable to modifications to resolve the violation. With the slices and sliced lines, the EDA tool may need to operate upon design data having reduced dimensionality and thus may resolve the violation more efficiently. With the categorization or classification of the existing shapes in the region, one or more criteria may be identified or determined for further processing and hence improving or optimizing the design data in the region. These criteria may be used to determine how at least some of the existing shapes in the region may be further processed. These criteria may include, for example, a criterion to increase or maximize the combined length of two or more shapes, a criterion to reduce or minimize perturbation to design data, etc.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-6.

FIG. 1 illustrates a high level block diagram of an electronic design automation system for a bottom-up electronic design implementation flow and track pattern definition for multiple-patterning lithographic techniques in one or more embodiments. In one or more embodiments, the high level block diagram illustrated in FIG. 1 may include one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc. The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more special purpose hardware mechanisms and one or more software modules that may comprises one or more track pattern processing and generation mechanism 102 to insert, remove, modify, improve, optimize, or otherwise operate upon one or more tracks or routing tracks in track patterns. The set of mechanisms 152 may further include one or more design traversal mechanism 104 to examine or traverse design data to identify an electronic design or a portion thereof, a circuit component design, and one or more circuit component designs interrelated with an identified circuit design component or portion within a context.

The set of mechanisms 152 may further optionally include one or more implementing option processing mechanisms 106 to identify, determine, modify, or rank viable implementing options (e.g., various track patterns for a region including one or more shapes) based in part or in whole on one or more criteria. In addition or in the alternative, the set of mechanisms 152 may further include a legal space and system region mechanism 108 to generate, modify, operate on, or manipulate one or more legal spaces or one or more system regions based in part or in whole upon dynamic implementation of at least a portion of interest of an electronic design. In some embodiments, the set of mechanisms 152 may further include one or more track pattern database evaluation mechanisms 110 to enumerate, determine, or update one or more legal track pattern tables, data structures, or databases to inquire into the one or more legal track pattern tables, data structures, or databases to generate viable implementing options for track patterns associated with various widths, to evaluate track patterns against various design rules, performance objectives, manufacturing requirements, and/or other constraints.

The set of mechanisms 152 may further include a design rule driven implementation mechanism 112 that either alone or in tandem with one or more other mechanisms (e.g., a layout editing mechanism, a track pattern processing and generation mechanism, etc.) to implement or aid to implement tracks or shapes in a layout of an electronic design while satisfying governing design rules. In addition or in the alternative, the set of mechanisms 152 may comprise a post-layout operation mechanism 114 to perform one or more post-layout operations including, for example, post-layout analyses, simulations, design rule check, tapeout, verification, etc. The set of mechanisms 152 may further include a legal width generation mechanism 116 that determines one or more permissible widths in a list, a table, or a data structure based in part upon one or more existing shapes in a layout.

In some embodiments, the computing system 100 may include the various resources 128 such that these various resources may be invoked from within the computing system via a computer bus 180 (e.g., a data bus interfacing a microprocessor 192 and the non-transitory computer accessible storage 162 or a system bus 196 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 4A:
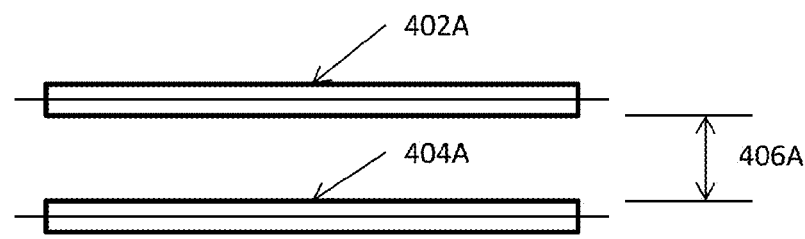
FIG. 4A illustrates a constant spacing design rule that requires two wire segments be spaced apart from each other at a constant spacing between corresponding edges of the wire segments.
Figures 1, 4A:
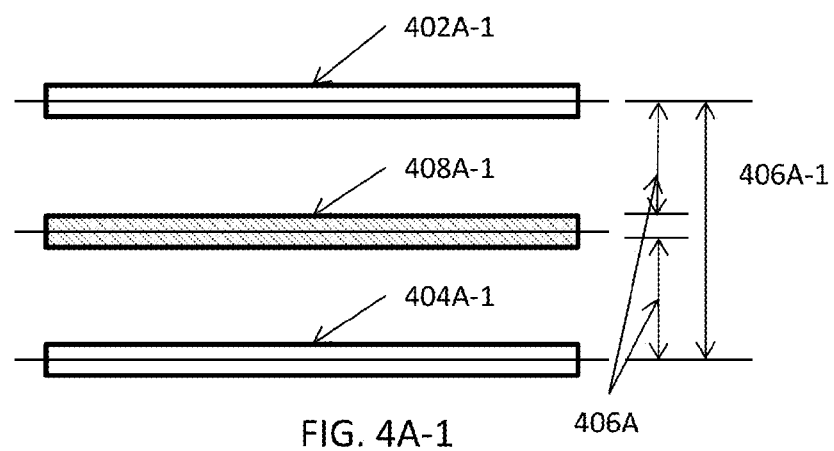
Figures 2, 4A:
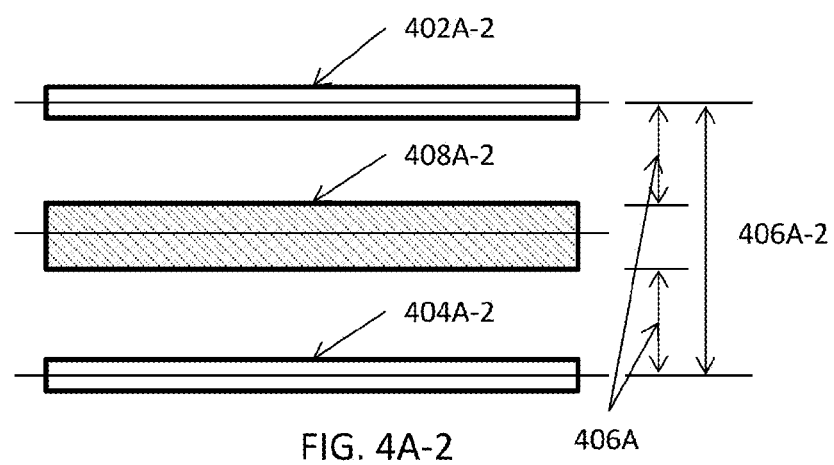
FIG. 2 illustrates a high-level block diagram for a bottom-up electronic design implementation flow and track pattern definition for multiple-patterning lithographic techniques in one or more embodiments.

FIG. 2 illustrates a high-level block diagram for a bottom-up electronic design implementation flow and track pattern definition for multiple-patterning lithographic techniques in one or more embodiments. One or more shapes along one or more routing track and having one or more respective widths may be identified in a region of a layout at 202. For example, a layout editing mechanism may identify one or more shapes in a layout window of a user interface. In some of these embodiments, a certain type of shapes (e.g., interconnects for integrated circuit or IC designs, traces for IC packaging designs and printed circuit board or PCB designs) may be required to be implemented along tracks (e.g., by aligning the centerline of a shape along a routing track). In these embodiments, this requirement that this certain type of shapes being implemented along routing tracks may be referred to as an on-track requirement or design rule.

A routing track or simply a track (hereinafter a "track") includes a one-dimensional fictitious line or line segment derived from the manufacturing grids provided by foundries. A routing track thus having zero width in physical designs (e.g., a layout of an electronic design) and is used to guide physical implementation tools (e.g., floorplanner, placement tools, or routing tools) to implement the physical design for an electronic design. For example, a routing tool may lay the centerline of a wire segment along a routing track during the routing process.

A routing track may nonetheless be associated with a width to indicate that the particular routing track is to be used to route wires having the associated width. In this application, some routing tracks may be illustrated as rectangular shapes to indicate that such routing tracks are associated with the widths as shown in various figures. Nonetheless, the rectangular representations of such routing tracks are not intended to explicitly, implicitly, or inherently indicate that routing tracks have two-dimensional geometrical structures or shapes.

A track pattern is a collection of one or more tracks associated with their respective widths of the shapes (e.g., wire segments) that are to be implemented along these one or more tracks. A track pattern is considered legal if the collection of one or more tracks in the track pattern complies with various design rules governing which arrangements or sequences of track associated with their respective widths are permitted. For example, a design may prohibit arranging a thin wire segment having a width of $w_1$ immediately adjacent to a thick or fat wire segment having a width of $w_2$ in any track pattern. Given this design rule, any track patterns having such an arrangement of two immediately neighboring tracks associated with $w_1$ with $w_2$ violate this design rule and will thus be considered illegal.

In these one or more embodiments, the one or more shapes identified at 202 may be identified based in part or in whole upon one or more design rules that may include one or more multiple patterning design rules, one or more track pattern design rules, etc. for advanced process nodes. Typical examples for nodes for multi-patterning processes include 14 nm, 10 nm, or smaller advanced nodes for double pattern processes including pitch-split self-aligned double patterning (SADP) such as a negative tone SADP (N-SADP), litho-etch-litho-etch (LELE), etc. These examples for nodes may further include advanced nodes for triple patterning lithography processes comprising, for example, the pitch-split self-aligned triple patterning (SATP) process such as a negative tone SATP (n-SATP), litho-etch-litho-etch-litho-etch (LELELE), litho-etch-litho-etch-end-cutting (LELEEC), etc.

The one or more shapes may be interactively inserted by a designer during an interactive layout editing session. For example, a designer may manually insert a shape into a portion of a layout, the design traversal mechanism may function in tandem with the layout editing mechanism to identify the manually inserted shape as the one or more shapes. In some embodiments where the on-track design rule requires that the one or more shapes be implemented along a routing track, but the manually inserted one or more shapes fail to satisfy the on-track design rule, a design rule driven mechanism may identify the manual insertion location of the one or more shapes and adjust the manual insertion location of the one or more shapes so that the one or more shape satisfy the on-track requirement.

These one or more design rules may be explicitly specified in or published through, for example, a rule deck or a tech-file in some embodiments. In some of these embodiments, these one or more design rules may also be implied due to one or more particular manufacturing processes that will be used to manufacture integrated circuits according to their respective electronic designs. For example, the use of a negative tone SADP process may imply a single or constant spacing design rule requiring a constant spacing distance between two immediately neighboring interconnects. Another design rule that may be implied by the N-SADP process includes a uni-directional routing design rule requiring that all routes be implemented in the right-way direction (e.g., the preferred routing direction), and that no wrong-way routing (e.g., routing in the non-preferred routing direction) is permitted on one or more layers of an electronic design. Other implied design rules may further include a limited number of permissible arrangements of interconnect widths.

In some embodiments, the one or more design rules may include the explicitly specified or implied design rules comprising, for example, a constant spacing design rule, a minimum length design rule, one or more pair design rules (or BC design rules), one or more triplet design rules (or BCB design rules), the same color line end spacing design rule, a different color line end spacing design rule, a same track, same color, different width line end spacing design rule, a different track, different color line end spacing design rule, an end of line keep-out design rule, an opposing end of line keep-out design rule, a minimum end of line spacing design rule, etc.

Design rules governing track patterns may allow only certain arrangements of widths and spacing values of shapes and thus only certain arrangements of width values and spacing values that may be associated with a track pattern comprising a plurality of routing tracks. For example, a pair design rule may allow a 32 nm interconnect (and hence a routing track associated with the 32 nm width value) to be immediately adjacent to another interconnect having a width value of 32 nm, 34 nm, 38 nm, 46 nm, and 58 nm and prohibits a routing track associated with the 32 nm width value to be immediately adjacent to another routing track associated with 62 nm, 70 nm, 76 nm, or 86 nm width value. Examples and more details about some design rules and their operations on electronic designs are described below with reference to FIGS. 4A-I.

At 204, a next width may be identified for a next shape to be implemented relative to the one or more shapes identified at 202. For example, a track pattern processing mechanism or a track pattern evaluation mechanism may identify a list of permissible widths or a width picker and select the next width from the list or the width picker. The list of permissible widths or the width picker may be dynamically determined based in part or in whole upon one or more existing shapes in the portion of the layout in some embodiments. In the example where the region of the layout already contains the one or more shapes, a legal width generation mechanism (e.g., reference numeral 116 of FIG. 1) may function in tandem with, for example, the track pattern processing and generation mechanism and/or the design rule driven (DRD) implementation mechanism to determine which width is permitted by various governing design rules in light of the one or more shapes in the region of the layout. In these embodiments, these governing design rules limit the available choices of widths for the next shape to be added to a region of a layout after the one or more shapes are added to the portion, and the choices for permissible widths for subsequent shapes become more limited as more shapes are added to the portion of the layout because certain design rules (e.g., the pair design rule, the triplet design rule, etc.) only allow certain arrangements of tracks associated with one or more widths and spacing values.

At 206, the next shape with the identified next width may be incrementally, interactively, or iteratively added to the portion of the layout based in part or in whole upon a legal space. For example, the layout editing mechanism may place the next shape having the identified next width relative to the one or more shapes in the same portion by referencing a legal space in some embodiments. A legal space includes at least an area and defines a distance between the one or more shapes identified at 202 and the next shape inserted at 206 when the next shape is snapped to the boundary of the legal space in some embodiments. A legal space defines the distance between the one or more shapes identified at 202 and the next shape inserted at 206 such that the arrangement of the one or more tracks and the next track both the one or more respective widths and the next width are legal or permissible, and that one or more legal solutions for one or more track patterns including the one or more tracks and the next track can be determined. In these embodiments, the legal space includes at least the area in which a legal track pattern including the one or more routing tracks, the next track, and zero or more other tracks can be determined according to, for example, the pair design rule and the triplet design rule. The distance between at least one shape of the one or more shapes and the next shape defined by the legal space is not necessarily the minimum spacing, depending on whether or not the legal track pattern includes at least one other track between the one or more tracks and the next track. In some embodiments where at least one routing track of the one or more tracks is immediately neighboring the next track, the distance defined by the legal space may constitute (although not necessarily so) the minimum spacing between the one or more shapes and the next shape. In some other embodiments where the legal track pattern includes one or more other tracks between the one or more tracks and the next track, the distance defined by the legal space is determined by the amount of space needed to render the arrangement of the one or more track from 202, the one or more other tracks, and the next track legal. In some embodiments where the next shape is added to the portion of the layout interactively, a legal space may dynamically change as, for example, the designer drags the next shape around the portion of the layout. In these embodiments, the legal space and system region generation mechanism dynamically (e.g., in nearly real-time or via dynamic sampling with one or more sampling frequencies) identifies a current location of the next shape, determines a legal space that defines a distance between the one or more shapes identified at 202 and the next shape inserted at 206 and provides at least one legal track pattern for the current location, and generates the legal space accordingly. A legal space also changes with the identified next width of the next shape to be implemented in some embodiments because different width combinations of the one or more shapes identified at 202 and the second shape inserted at 206 (with the one or more widths being fixed and the next width varying) may require different distances to generate at least one legal track pattern for a legal space.

Once the legal space is determined, and the next shape is inserted, the system region may be expanded to accommodate the newly added next shape. A system region may be arbitrarily created (e.g., a user defined system region) to encompass the shapes that are added to a portion of a layout for the purpose of generating a custom legal track pattern in some embodiments. For example, an initial system region may be generated around the one or more shapes when the one or more shapes are inserted into the portion of the layout. When the next shape is inserted, or when the final location of the next shape is determined, the initial system region may be augmented to encompass both the one or more shapes identified at 202 and the next shape inserted at 206 by enlarging the size of the initial system region and/or by changing the shape of the system region to for an expanded system region.

A system region may also be defined or created by referencing certain objects or objects in the electronic design. In the example illustrated in FIG. 5E, the system region 502E may be defined in such a way that the distance between the upper boundary segment of the system region 502E and the upper edge of shape 502D is one half of, for example, the minimum spacing value in some embodiments. In some other embodiments, the system region 502E may be defined or created by referencing the corresponding routing tracks of the two outermost shapes. In the example illustrated in FIG. 5E, the routing track 506D and the routing track segment 508E in the system region 502E may be respectively determined to be the upper boundary segment and the lower boundary segment of the system region 502E.

At 208, one or more legal track patterns may be generated by generating zero of more tracks between the one or more shapes identified at 202 and the second shape inserted at 206 and further by converting, for example, the system region or the expanded system region including the one or more tracks of the one or more shapes, the zero or more tracks between the one or more tracks and the next track, and the next track of the next shape into a legal track pattern. Depending on the combinations of the one or more shapes identified at 202 and the next shape inserted at 206, the space between the one or more shapes and the second shape may allow more than one track pattern to be generated in some embodiments.

In these embodiments, the more than one track pattern may be presented to the designer to identify a final track pattern to be generated. In some other embodiments, all legal track patterns for the combination of the one or more shapes and the next shape may be generated. In some embodiments, the track pattern generation mechanism may rank or prioritize the more than one legal track pattern based in part upon one or more optimization criteria for the electronic design. These one or more optimization criteria may include, for example, the impact of generating a legal track pattern for the region on another portion of the electronic design (e.g., the impact of generating a legal track pattern including tracks associated 1x-width for the region on another region including tracks associated with 2x-width), a cost function evaluating these legal track patterns (e.g., tracks associated with wider widths provide greater flexibility in routing but occupy more space, power nets may require tracks associated with wider widths, etc.), or any other suitable criteria.

A parallel fill mechanism and/or a lateral fill mechanism as described in the related U.S. patent applications listed in the Cross Reference to Related Applications section may also be invoked to perform parallel fill and/or lateral fill to the region at 208. In the context of interconnects of integrated circuits or traces for IC packaging designs or PCBs, a parallel fill shape implementation for an interconnect includes extension or contraction of the interconnect along the same routing track on which the centerline of the interconnect lies, regardless of whether or not the interconnect already has one or more parallel fill shapes aggregated into one or both ends in some embodiments. In other words, implementing a parallel fill shape for an original shape may include additions (attachment or aggregation of a positive geometric shape) of one or more extra shapes or removal (attachment or aggregation of a negative geometric shape) of one or more previously added fill shapes or of the existing, original shape in these embodiments. For example, if an interconnect already has an additional parallel fill shape aggregated into one end, further implementations of parallel fill shapes for this interconnect may include removing at least a part of the additional parallel fill shape on the one end, removing a part of the original interconnect on the other end, or both.

In some embodiments, the parallel fill mechanism may present one or more hints or suggestions for implementing the one or more parallel fill shapes (via addition or subtraction) on a display apparatus and may further present the impact of the presented one or more hints or suggestions prior to actually implement the parallel fill shapes. For example, the parallel fill mechanism may present the one or more hints or suggestions as one or more DRC markers. The parallel fill mechanism may further present the impact of these one or more DRC markers in a textual form, graphical form, or both. For example, the parallel fill mechanism may function in tandem with the DRC engine or mechanism to indicate the type, extent, or severity of violations for one or more of these DRC markers.

The lateral fill mechanism may insert one or more lateral fill shapes according to the legal track patterns based in part upon the design components in the neighboring region(s) on the same layer or even on one or both adjacent layers of the electronic design. Lateral fills shapes may include shapes such as dummy metal fill shapes that are inserted in an unoccupied region along one or more routing tracks between two shapes residing on two different routing tracks in a layout according to various design rules or constraints. For example, a layout may include two shapes respectively residing on the one or more routing tracks and the next routing track that sandwich one or more routing tracks therebetween. One or more lateral fill shapes may be inserted along at least one of these one or more routing tracks between the one or more tracks identified at 202 and the next routing track according various design rules governing track patterns and/or multiple-patterning mask designs. In some embodiments, the approaches described herein may insert lateral fill shapes to ensure that the generated layout complies with design rules including, for example, track pattern design rules, minimum spacing design rules, width rules, etc. More details about the parallel fill mechanism and the lateral fill mechanism are described in the related U.S. patent applications listed in the Cross Reference to Related Applications section FIGS. 3A-D jointly illustrate a more detailed block diagram for a bottom-up electronic design implementation flow and track pattern definition for multiple-patterning lithographic techniques in one or more embodiments. In these one or more embodiments, a base set of legal track patterns complying with the track pattern design rules (e.g., the pair design rule, the triplet design rule, etc.) may be identified at 302. A base set of legal track patterns may be explicitly specified or implicitly implied in, for example, a rule deck and may be published through one or more tech-files for an electronic design. For example, the chip architect or project leader may publish a base set of design rules in a tech-file to distribute these legal track patterns among members of the team to share these track patterns. These legal track patterns may also be provided by one or more foundries in some embodiments or specifically devised for the project by the chip architect or project leader in some other embodiments. Because the base track patterns are legal, designers using the base legal track patterns to implement an electronic design may assure that the implemented electronic design complies with the explicitly specified and implicitly implied design rules.

A track pattern may include one or more formats comprising, for example, a textual format, a listing of tracks and their attributes, a graphical format representing geometric characteristics of the tracks in the track pattern, any combinations thereof, or any other suitable formats, etc. In one embodiment, a track pattern may include a bitmask which comprises an array of bits or bytes indicating specific attributes of the tracks in the track pattern. For example, a track pattern may constitute $\{w_1, w_2, w_3, \ldots w_n\}$, where $w_i$ includes a bit value or byte value representing the width for the i-th track. For example, for a set of eight permissible width values $w_1, w_2, \ldots w_8$, a track pattern including ten (10) tracks may be represented as $\{0, 2, 5, 1, 0, 7, 6, 4, 2, 1\}$. The first track through the tenth track in this track pattern are respectively associated with the width $w_1, w_3, w_6, w_2, w_1, w_8, w_7, w_5, w_3, w_2$, where the byte value 0 correspond to $w_1$, the byte value 1 corresponds to $w_2$, etc.

One or more design rules that govern multiple-patterning process nodes and/or legality of track patterns for a layout of an electronic design may be identified at 304. These design rules may include, for example, a constant spacing design rule, a minimum length design rule, one or more pair design rules (or BC design rules), one or more triplet design rules (or BCB design rules), the same color line end spacing design rule, a different color line end spacing design rule, a same track, same color, different width line end spacing design rule, a different track, different color line end spacing design rule, an end of line keep-out design rule, an opposing end of line keep-out design rule, a minimum end of line spacing design rule, the periodicity design rule, the track count design rule, etc. More details about some of some design rules will be described below with reference to FIGS.

4A-I. At 306, a canvas or portion of a layout may be identified by, for example, a design traversal mechanism or a layout editing mechanism. A canvas identified at 306 may or may not include any circuit element designs therein. For example, a layout editing mechanism may identify an empty canvas at 306 in some embodiments. In some other embodiments, the layout editing mechanism may identify a canvas including one or more shapes. A canvas identified at 306 may or may not necessarily correspond to any base legal track patterns. Therefore, in some embodiments where the canvas already includes one or more shapes, the one or more tracks corresponding to these one or more shapes either may or may not correspond to one or more base legal track patterns in the base set of legal track patterns.

At 308, a first shape is identified and inserted into the portion or canvas. For example, a layout editing mechanism may identify a designer's attempt to insert a first shape (e.g., by using a pointing device to drag a first shape into the portion of the layout) into the portion of the layout during an interactive layout editing session at 308. After the insertion of the first shape into the canvas, the canvas including the first shape does not correspond to any base legal track patterns provided by the base set of legal track patterns in some embodiments. That is, a designer is no longer able to identify a base legal track pattern that matches the arrangement of one or more tracks including the first track for the first shape in the canvas. Some of the techniques described herein allow a designer to create a custom track pattern that is legal (e.g., complying with governing design rules) as the designer iteratively, incrementally, or interactively implements the electronic design in the canvas. A system region may be generated at 310 in response to the insertion or addition of the first shape by, for example, a system region and legal space generation mechanism (e.g., reference numeral 108 of FIG. 1). A system region may include an arbitrarily defined region enclosing the first shape in some embodiments. In some embodiments where interconnects or traces are among the circuit component designs to be implemented, the system region may further include the first track on which the first shape is implemented (e.g., via aligning the centerline of the first shape with the first track). If the canvas also includes one or more other existing shapes whose one or more tracks may be grouped into the same track pattern as the first track of the first shape, the system region may also include the one or more tracks corresponding to these one or more existing shapes. At 312, a list of legal widths may be determined for a subsequent second shape that is to be implemented in the canvas by. A legal width determination mechanism may either alone or in tandem with one or more other mechanisms (e.g., a DRD implementation mechanism, a design rule mechanism, etc.) to identify the first width and/or the position of the first shape and determine what the permissible width may be for the second shape. In some embodiments, the list of legal widths may be presented in an order or priority reflecting the impact or effect of these widths on the electronic design. The order or priority may be determined based on one or more criteria. For example, the order or priority of a legal width may be determined based on the flexibility of the track with which the legal width is associated. Tracks associated with larger width values provide more flexibility than track associated with smaller width values. In addition or in the alternative, a larger width may be assigned a higher order or priority for a power net or for nets near or may be connected to power nets. Smaller (or larger) width values may also incur a higher cost (or higher negative impact) when the shape for which a width value is selected is implemented near or is expected to interconnect some wider (or narrow) shapes due to the expected transition between different widths. In some embodiments, the order or priority of a width value may be determined based in part on one or more surrounding shapes that have been or will be implemented near the shape having the particular width value.

In some embodiments, the list of permissible or legal widths may change dynamically with the position of the second shape (e.g., when the designer drags the second shape around in the canvas). For example, if the second shape is within certain proximity of the first shape such that the space between the first shape and the second shape is insufficient to accommodate another shape, the legal width determination mechanism may identify the legal widths according to, for example, the pair design rules or the triplet design rules that requires certain combinations of widths that can be legally associated with two immediately neighboring tracks. As another example, the changes in the position of the second shape in the canvas may also affect the candidacy of legal widths for the second shape because of, for example, the requirements of a periodicity requirement for repeated track patterns, a parallel run length design rule for a limit on the length of two shapes in the same direction, etc. At 314, a second width for a second shape to be implemented may be identified from the list of legal widths. In some of these embodiments, the length or ends of the second shape may also be identified at 314.

One or more legal spaces may be determined at 316 for the first shape for guiding the second shape insertion based in part or in whole upon the second width and/or the second length. The second length of the second shape may affect the legal space due to, for example, one or more design rules such as the end of line design rule, the opposing end of line design rule, etc. A legal space includes at least an area and defines a distance between the first shape and the second shape when the second shape is snapped to the boundary of the legal space in some embodiments. A legal space defines the distance between the first and second shapes such that both the first width and the second width are legal or permissible, and that one or more legal solutions for one or more track patterns including the first track and the second track can be determined. In these embodiments, the legal space includes at least the area in which a legal track pattern including the first track, the second track, and zero or more other tracks can be determined according to, for example, the pair design rule and the triplet design rule.

The distance between the first and second shapes defined by the legal space is not necessarily the minimum spacing, depending on whether or not the legal track pattern includes at least one other track between the first track and the second track. In some embodiments where the first track is immediately neighboring the second track, the distance defined by the legal space may constitute (although not necessarily so) the minimum spacing between the first and the second shapes. In some other embodiments where the legal track pattern includes one or more other tracks between the first track and the second track, the distance defined by the legal space is determined by the amount of space needed to render the arrangement of the first track, the one or more other tracks, and the second track legal.

In some embodiments where the second shape is added to the portion of the layout interactively, a legal space may dynamically change as, for example, the designer drags the second shape around the portion of the layout. In these embodiments, the legal space and system region generation mechanism dynamically (e.g., in nearly real-time or via dynamic sampling with one or more sampling frequencies)

identifies a current location of the second shape, determines a legal space that defines a distance between the first and the second shapes and provides at least one legal track pattern for the current location, and generates the legal space accordingly.

A legal space also changes with the identified second width of the second shape to be implemented in some embodiments because different width combinations of the first and second shapes (with the first width being fixed and the second width varying) may require different distances to generate at least one legal track pattern for a legal space. In the example illustrated in FIG. 5D, the legal space 504D is generated to enclose at least a part of the shape 502A. Nonetheless, a legal space does not necessarily need to enclose the first shape. In some embodiments, a legal space may be generated on one side of the first shape where the second shape is to be situated. In these embodiments, the legal space may dynamically switch to the other side of the first shape when the second shape moves to the other side of the first shape.

Figure 5A:
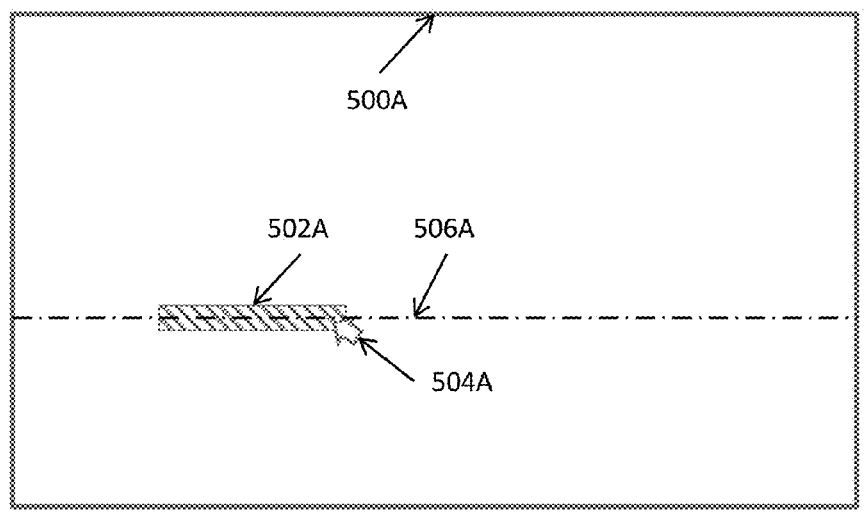
Figure 5B:
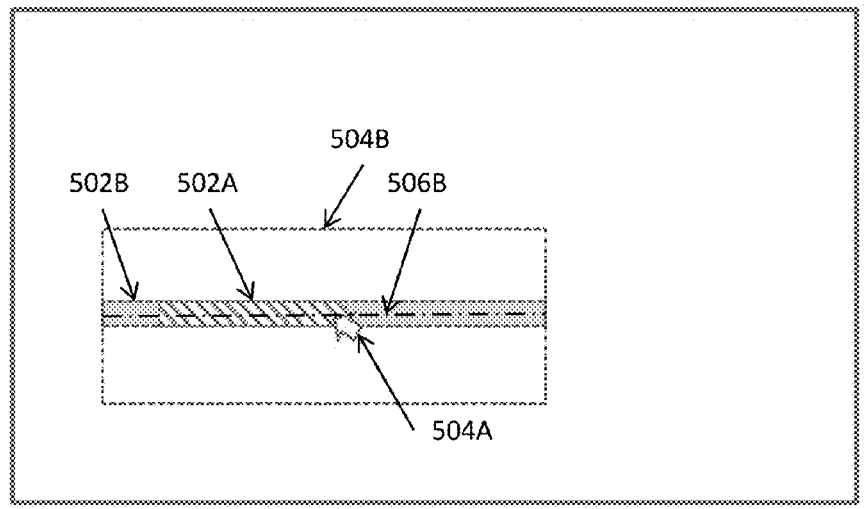
Figure 5C:
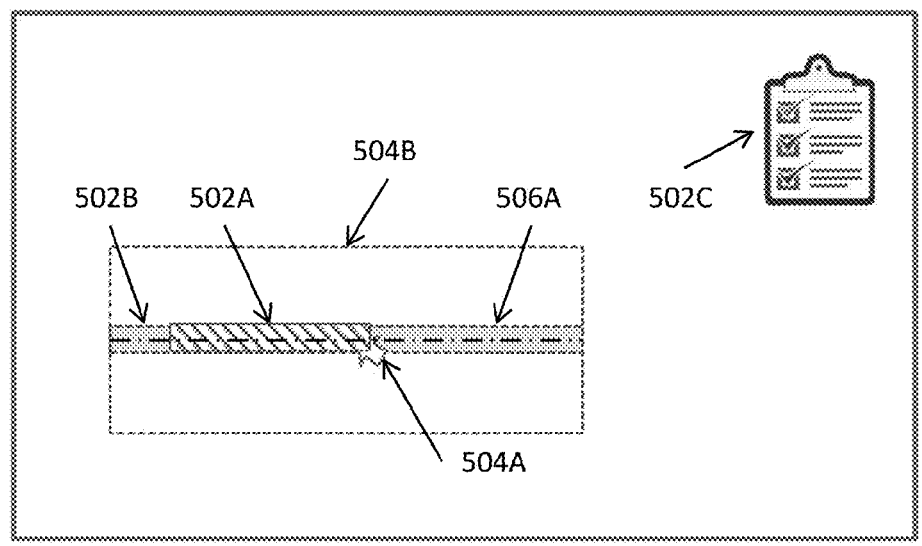
Figure 5D:
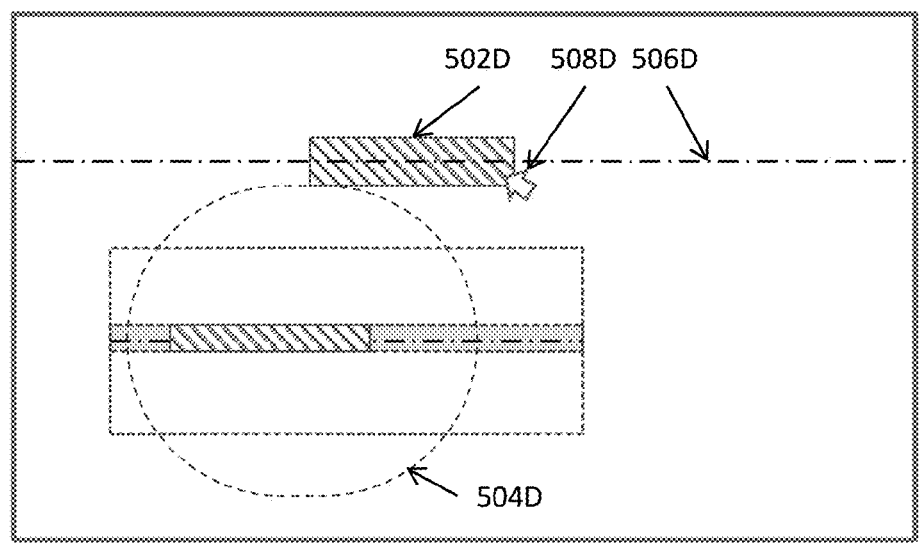

It shall also be noted that although FIG. 5D shows that the second shape 502D is snapped to the edge of the legal space 504D, the boundary of the legal space 504D does not follow the second shape. Rather, a legal space corresponds to a set of discrete sizes to define the area required for a legal solution for track patterns. Therefore, depending on where the second shape is moved to, the system region and legal space generation mechanism may discontinuously, rather than continuously, change the size and/or shape of the legal space accordingly among these discrete sizes.

At 318, a location for the insertion of the second shape having the second width may be determined by, for example, the DRD implementation mechanism, the layout mechanism, the design rule mechanism, or any combinations thereof. In some embodiments including an interactive layout editing session, the second location of the second shape may be identified from the user input (e.g., the location of a point device cursor). In some of these embodiments, the second location may be identified to be the closest legal position based on the current location of the second shape in the canvas. At 320, it may be determined whether the identified location is to be overridden. For example, a legal space may be generated to accommodate both the first track for the first shape and the second track for the second shape as well as one additional track in between.

A three-track legal track pattern may be formed when the second shape is positioned at or snapped to the boundary of the legal space. The designer may nevertheless move the second shape into the legal space at a certain spacing value from the first shape such that no legal space may be defined to provide legal solutions for a legal track pattern having three or more tracks. In this example, the identified position is considered overridden at 320. In some embodiments where the identified second location is overridden, another legal width may be identified from the list of legal widths as the second width at 322. Alternatively, the system region and legal space generation mechanism may apply the spacing design rule to generate a legal space that provides a legal solution for a legal track pattern having only two tracks—the first track for the first shape and the second track for the second shape.

At 324, the second shape may be inserted at the location in the canvas by, for example, the layout editing mechanism, the DRD implementation mechanism, the design rule mechanism, or any combinations thereof. The system region may be updated or modified into an expanded system region at 326 for the first shape along the first track and the second shape along the second track by, for example, the system region and legal space generation mechanism in some embodiments. It may be optionally determined whether or not the arrangement of the first track, the second track, and the space in between the first and second tracks matches one or more base legal track patterns in the base set at 328. In some embodiments, various mechanisms may identifying one or more matching base legal track patterns from the base set (e.g., by performing a table look-up or query in a table or database of base legal track patterns generated by the track pattern enumeration mechanism) from the time the first shape is inserted into the canvas. In these embodiments, these various mechanisms (e.g., a track pattern processing and generation mechanism, an implementation option processing mechanism, a DRD implementation mechanism, a layout editing mechanism, etc.) may monitor the insertion and removal of shapes and update the matching, legal track patterns accordingly and thus need not determine whether the arrangement matches one or more base legal track patterns at 328. At 330, one or more legal track patterns may be incrementally generated, where each track pattern of the one or more incrementally generated legal track patterns encloses the first track, the second track, and the space between the first and second tracks. In some embodiments, these one or more legal track patterns may be incrementally generated when it is determined that the arrangement of the first track, the space between the first track and the second track, and the second track does not match any base legal track patterns at 328. In some embodiments where it is determined that one or more matching base legal track patterns match the arrangement of the first track, the space between the first and the second tracks, and the second track, the design implementation may then continue with the one or more matching base legal track patterns at 332. The flow may return, at 334, to 314 to identify another legal width from the list of legal widths and repeat the acts of 314 through 332 until all the shapes of interest are processed.

The expanded system region may be converted into a custom legal track pattern at 336 in a textual format, a graphical format, or both by including the tracks, their associated widths, the relative locations, or any other suitable information, etc. The custom track pattern may then be used for the implementation of the canvas in the layout by, for example, placing the centerline of a shape along a track in the track pattern. Because the track may be associated with a width value, the shape having a certain width may be implemented along a track associated with the certain width or a larger width value. The one or more generated legal track patterns may be examined at 338 by comparing the one or more generated legal track patterns to the base set of legal track patterns with, for example, a track pattern processing and generation mechanism. At 340, redundancy removal may be performed to discard at least one of the one or more generated legal track patterns when it is determined that one base legal track pattern in the base set matches the at least one generated track pattern.

At 342, a plurality of shapes may be optionally identified in a first region of the layout at 342. In some embodiments, the first region is not associated with any legal track patterns. One or more characteristics may be optionally identified at 344 for the plurality of shapes. The one or more characteristics may include, for example, the locations (or alternatively a location of a first track and offsets of the other tracks from the first track) of and the widths associated with the routing tracks along which at least some of the plurality of shapes are implemented in some embodiments. One or more first legal track patterns that correspond to the plurality of shapes may be optionally determined at 346. These one or more first legal track patterns and/or the base legal track patterns may be optionally examined at 348 to determine whether or not the one or more first legal track patterns match those base legal track patterns in the base set. A redundant legal track pattern will be removed or not saved to avoid having duplicated track patterns. At 350, at least one generated track pattern and/or one or more of the optionally generated first track pattern may be stored in design in embodiments. In addition or in the alternative, the at least one generated track pattern and/or one or more of the optionally generated first track pattern may be exported to a central repository to be reused or shared among designs or designers for collaboration.

FIGS. 4A-I illustrates some illustrative design rules governing track patterns in electronic circuit designs in some embodiments. More specifically, FIG. 4A illustrates a constant spacing design rule that requires two wire segments 402A and 404A be spaced apart from each other at a constant spacing between corresponding edges of the wire segments as shown by the distance 406A in FIG. 4A. FIG. 4A-1 illustrates a scenario where two wire segments 402A-1 and 404A-1 are spaced at a distance 406A-1 that is different from and thus violates the constant spacing rule in some embodiments.

Various methods or systems may use techniques described herein to identify and insert another track 408A-1 between the first track for wire segment 402A-1 and the second track for wire segment 404A-1 to satisfy the constant spacing design rule. FIG. 4A-2 illustrates a scenario where two wire segments 402A-2 and 404A-2 are spaced at a distance 406A-2 that is different from and thus violates the constant spacing rule in some embodiments. Various methods or systems may use techniques described herein to identify and insert another track 408A-2 between the first track for wire segment 402A-2 and the second track for wire segment 404A-2 to satisfy the constant spacing design rule.

Figure 4B:
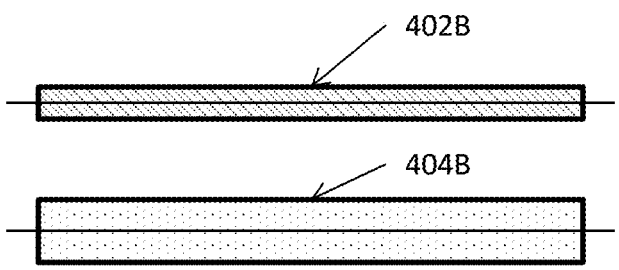
FIGS. 4B-I illustrates some illustrative design rules governing track patterns in electronic circuit designs in some embodiments.

FIG. 4B illustrates a pair design rule which requires two adjacent wire segments 402B and 404B spaced at a certain distance be placed on two separate photo masks for manufacturing. Each wire segment is then associated with its respective photomask designation. This design rule may further govern what width combinations are legal. In other words, given a set of width values that may be used to implement wires in an electronic design, only a smaller subset of width combinations out of the set of all possible width combinations are considered legal.

Figure 4C:
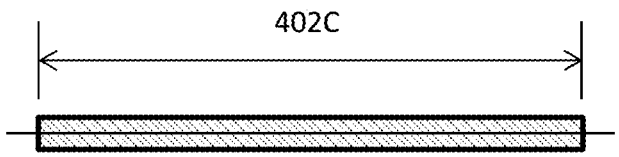
Figure 4D:
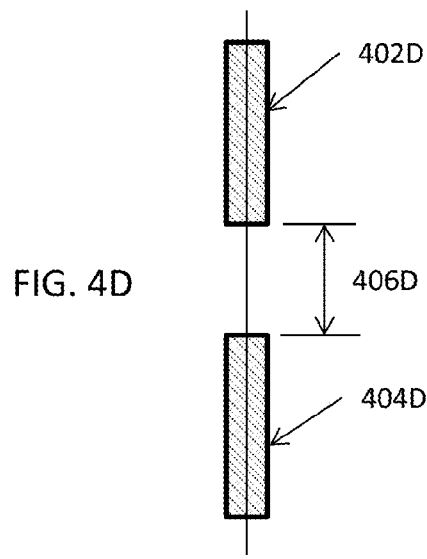

FIG. 4C illustrates a minimum length design rule that requires each wire segment in an electronic design to have at least the minimum required length 402C in order to comply with this minimum length design rule. FIG. 4D illustrates the same track, same color line end spacing design rule which requires that the two facing line ends of two wire segments 402D and 404D along the same routing track and with the same photomask designation be spaced at a distance that is greater than or equal to a minimum line-end spacing value 406D.

Figure 4E:
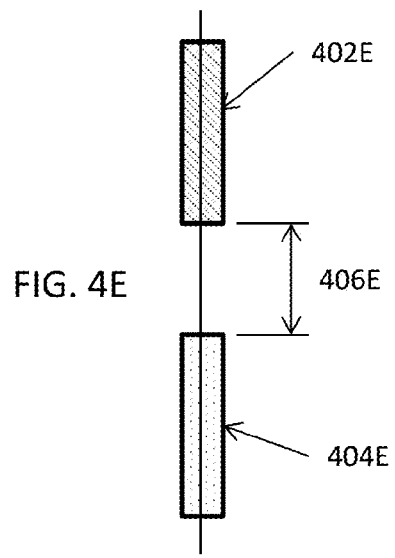
Figure 4F:
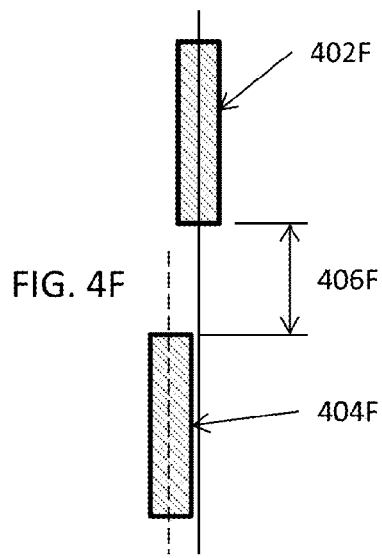

FIG. 4E illustrates the same track, different color line end spacing design rule which requires that the two facing line ends of two wire segments 402E and 404E along the same routing track but with different photomask designations be spaced at a distance that is greater than or equal to a minimum line-end spacing value 406E. FIG. 4F illustrates the different track, same color line end spacing design rule which requires that the two facing line ends of two wire segments 402F along the first track and 404F along the second routing track with same photomask designation be spaced at a distance that is greater than or equal to a minimum line-end spacing value 406F.

Figure 4G:
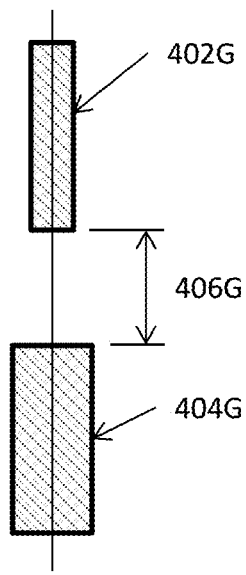
Figure 4H:
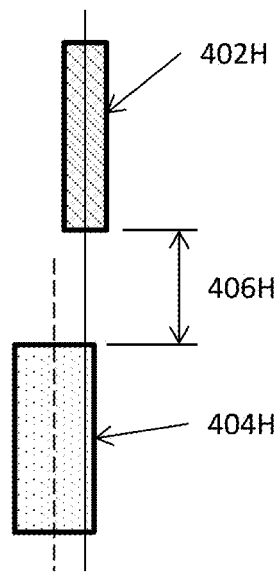

FIG. 4G illustrates the same track, same color, different width line end spacing design rule which requires that the two facing line ends of two wire segments 402G having a first width and 404G having a second width along the same routing track and with the same photomask designation be spaced at a distance that is greater than or equal to a minimum line-end spacing value 406G. FIG. 4H illustrates the different track, different color line end spacing design rule which requires that the two facing line ends of two wire segments 402H along the first track and 404H along the second routing track but with different photomask designation be spaced at a distance that is greater than or equal to a minimum line-end spacing value 406H.

Figure 4I:
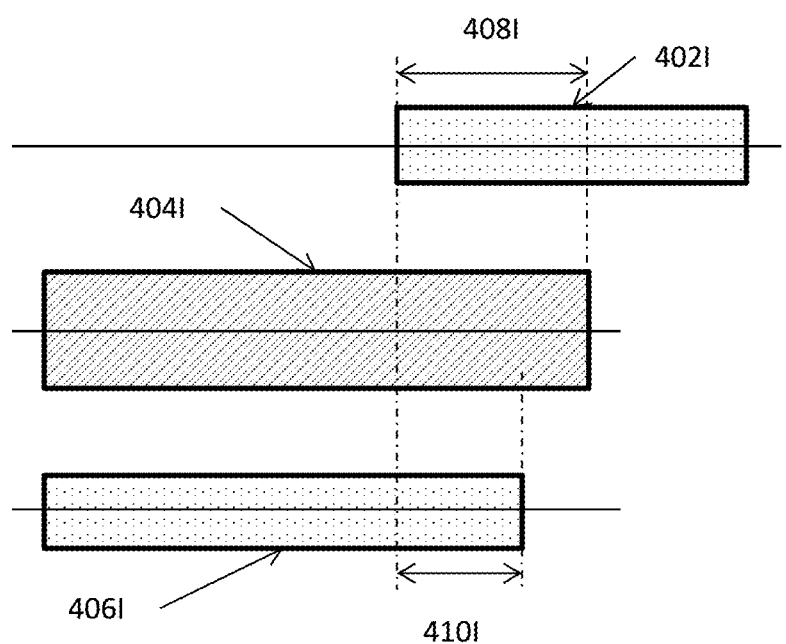

FIG. 4I illustrates a keep-out design rule. In FIG. 4I, the first wire segment 402I and the third wire segment 406I have the same photomask designation, and the second wire segment 404I has a different photomask designation. Each wire segment is associated with its respective width, and the three-track combination with three respective widths satisfies the triplet design rule. The keep-out rule requires that the overlapping line end of the first wire segment 402I is at a distance that is greater than or equal to the keep-out distance 408I from the overlapping line end of the second wire segment 404I. The keep-out rule also requires that the line end of the other adjacent wire segment 406I of the second wire segment 404I is at a distance that is greater than or equal to the "next neighbor keep-out" distance 410I from the overlapping line end of the second wire segment 404I. The "next neighbor keep-out" distance 410I may be dependent on the width of the second wire segment 404I in some embodiments.

FIGS. 5A-I illustrate an example of the application of some techniques described herein for a bottom-up electronic design implementation flow and track pattern definition for multiple-patterning lithographic techniques in some embodiments. More specifically, FIG. 5A illustrates a canvas 500A of a layout. As described above, the initial canvas may be empty in some embodiments or may include one or more shapes in some other embodiments. For the simplicity of explanation and illustration, the initial canvas 500A includes an empty canvas in this example. A first shape 502A may be inserted into the canvas along the first track 506A. For example, a designer may drag the first shape 502A in the canvas by, for example, manipulating the point device cursor 504A in a bottom-up design implementation flow such as an interactive layout editing session starting with an empty or partially implemented design canvas. In some embodiments where the first shape 502A is manipulated and dropped at a location that is not aligned with the first track 506A, the layout editing mechanism may function in tandem with, for example, the DRD implementation mechanism to position the first shape along the first track 506A.

FIG. 5B illustrates some additional progress of the bottom-up design implementation flow in some embodiments. In FIG. 5B, a system region 504B may be generated by, for example, the system region and legal space generation mechanism for the first shape 502A. A routing track segment 502B and/or 506B may also be drawn and included in the system region 504B. The routing track may be drawn as rectangle (502B) in some embodiments or as a line segment (506B) in some other embodiments. A routing track includes a reference line or reference line segment having no width. Nonetheless, a routing track may be associated with a width value which may be inherited by the shape implemented along the routing track. Therefore, a rectangular routing track as illustrated by 502B may be drawn to reflect the width associated with the routing track. The width of a routing track does not, however, specify or imply that the routing track has a non-zero thickness.

FIG. 5C illustrates a list of legal widths 502C from which a permissible width value may be selected for the implementation of the subsequent second shape. It shall be noted that the list of legal widths 502C may be represented in any form (e.g., in a pop-up window, a pull-down menu, etc.) in any part of the user interface and thus not necessarily in the canvas as shown in FIG. 5C. FIG. 5D illustrates further progress of the bottom-up design implementation flow. The canvas includes a second shape 502D which is implemented along the second routing track 506D. For example, a designer may drag the second shape 502D around in the canvas by manipulating the pointing device cursor to the new location 508D. FIG. 5D further illustrates the generation of a legal space 504D that is determined based in part upon one or more characteristics of the first shape 502A. The legal space 504D is determined to includes at least an area and defines a distance between the first shape and the second shape when the second shape is snapped to the boundary of the legal space in some embodiments. A legal space defines the distance between the first and second shapes such that both the first width and the second width are legal or permissible, and that one or more legal solutions for one or more track patterns including the first track and the second track can be determined.

Figure 5E:
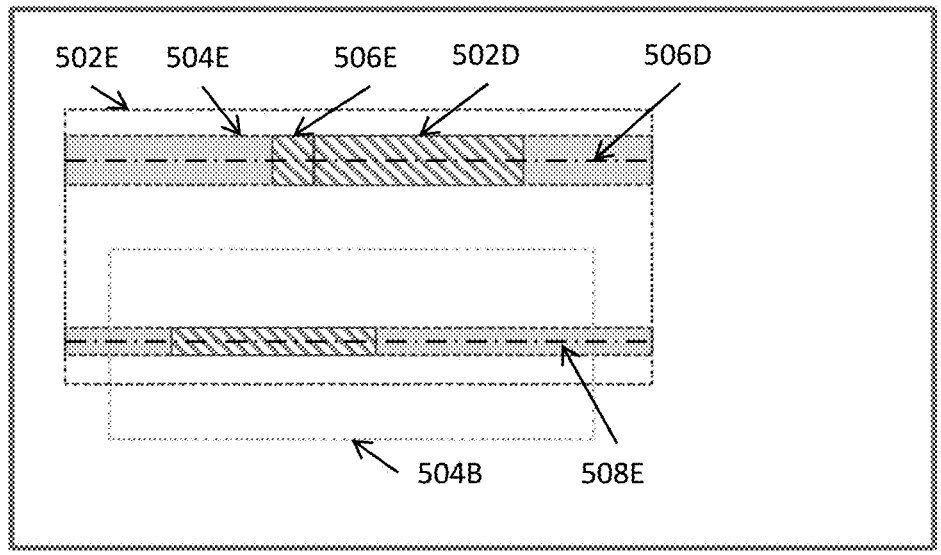

FIG. 5E illustrates the optionally performed parallel fill to extend shape 502D by the parallel fill shape 506E to meet the opposing end of line design rule. It is assumed that the left end of shape 502D along the track 504E in the system region 502E and the right end of the first shape 502A do not meet the opposing end of line design rule. The parallel fill mechanism may implement the parallel fill shape 506E in such a way that shape 502D along with the parallel fill shape 506E now satisfies the opposing end of line design rule. FIG. 5E further illustrates the original system region 504B is updated to the expanded system region 502E to accommodate the newly added shape 502D and its corresponding routing track 504E.

Figure 5F:
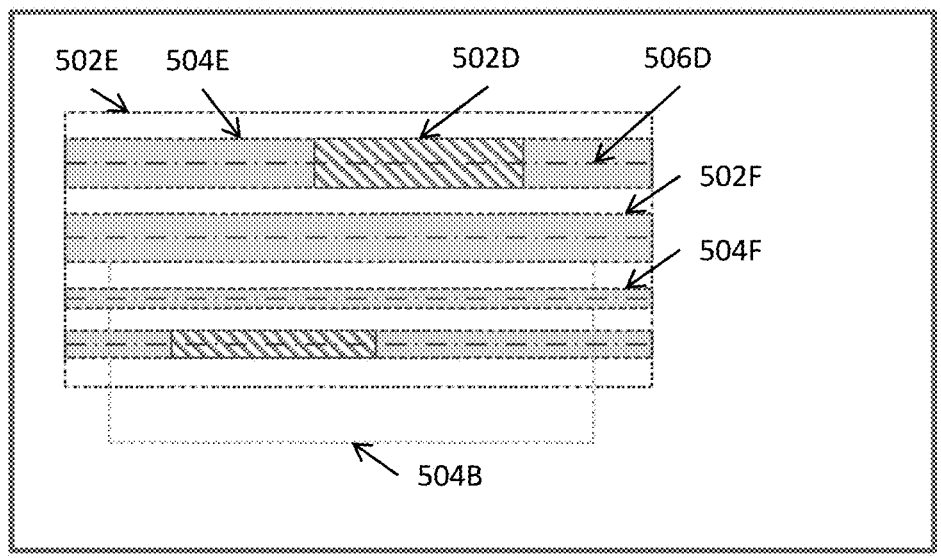

FIG. 5F illustrates further progress of the bottom-up design implementation flow in some embodiments. In FIG. 5F, two more routing tracks 502F and 504F are added to the expanded system region 502E which now includes four routing tracks 504E, 502F, 504F, and 502B. These two additional routing tracks may be added by the track pattern processing and generation mechanism in compliance with the requirements of one or more design rules governing track patterns.

Figure 5G:
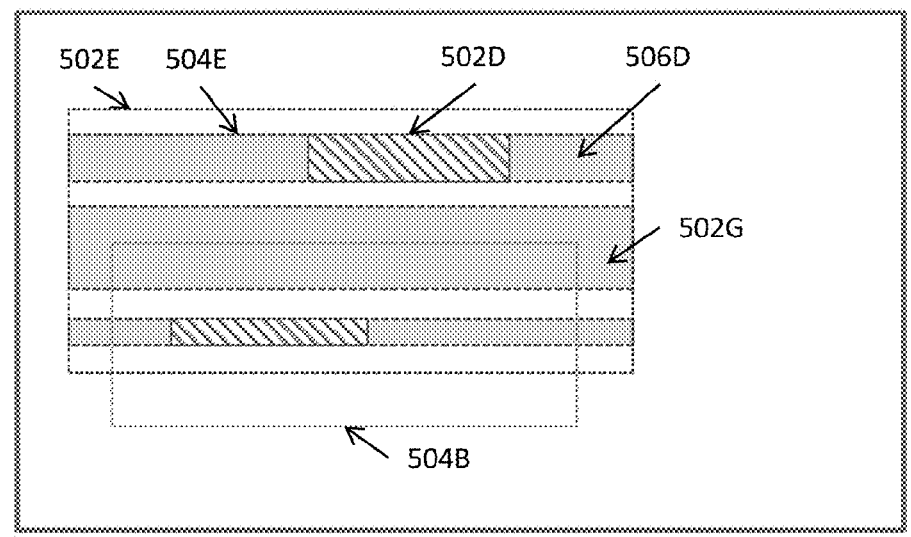

FIG. 5G illustrates an alternative progress of the bottom-up design implementation flow in some embodiments. In FIG. 5G, one additional routing track 502G is added to the expanded system region 502E which now includes four routing tracks 504E, 502G, and 502B. This additional routing track may be added by the track pattern processing and generation mechanism in compliance with the requirements of one or more design rules governing track patterns.

Figure 5H:
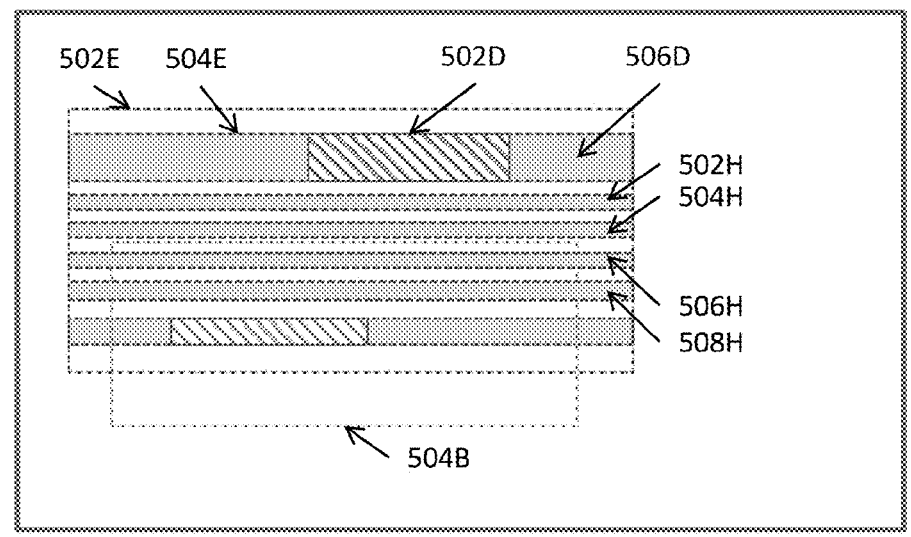
Figure 51:
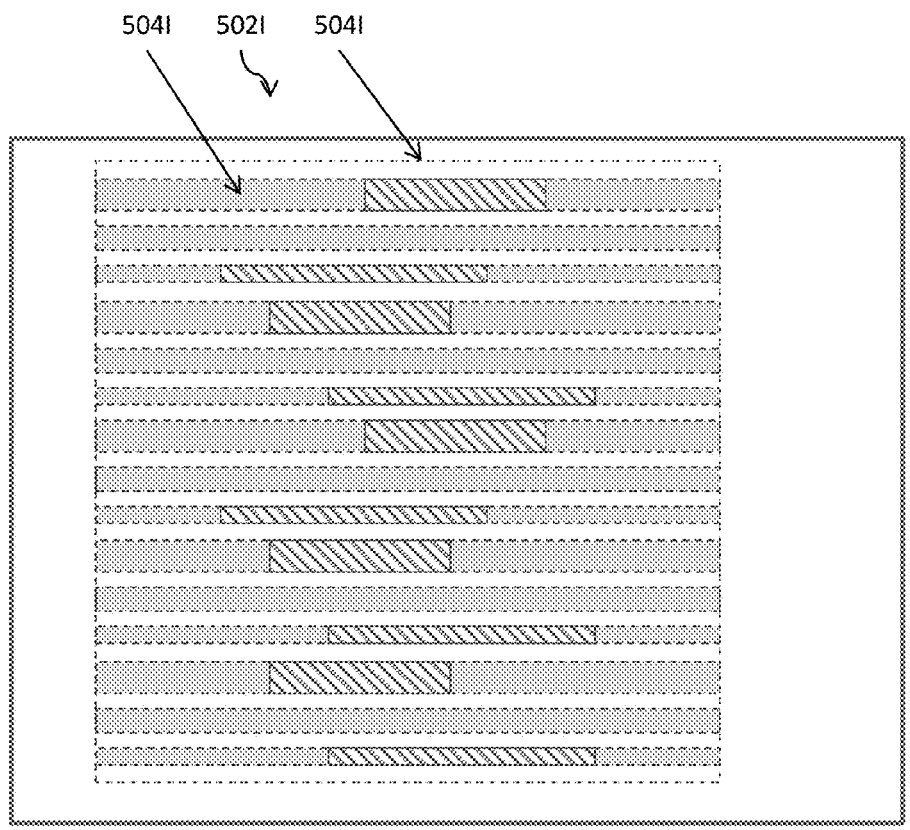

FIG. 5H illustrates further progress of the bottom-up design implementation flow in some embodiments. In FIG. 5H, four more routing tracks 502H, 504H, 506H, and 508H are added to the expanded system region 502E which now includes six routing tracks 504E, 502H, 504H, 506H, 508H, and 502B. These four additional routing tracks may be added by the track pattern processing and generation mechanism in compliance with the requirements of one or more design rules governing track patterns. FIG. 5I illustrates an example of an implemented canvas 502I that includes a further expanded system region 506I comprising a plurality of routing tracks 504I. The expanded system region 504I may be converted into a track pattern as described above with reference to FIGS. 3A-D.

System Architecture Overview

Figure 6:
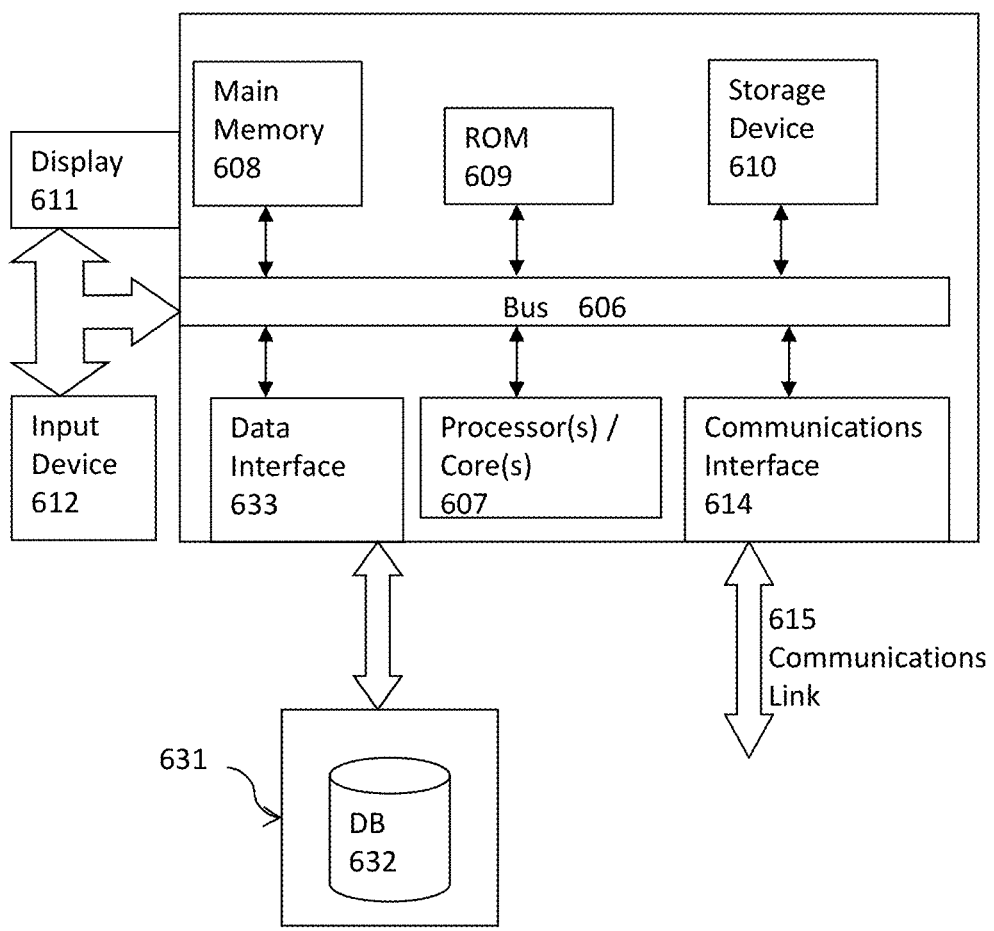
FIG. 6 illustrates a computerized system on which a method for a bottom-up electronic design implementation flow and track pattern definition for multiple-patterning lithographic techniques may be implemented.

FIG. 6 illustrates a block diagram of an illustrative computing system 600 suitable for a bottom-up electronic design implementation flow and track pattern definition for multiple-patterning lithographic techniques as described in the preceding paragraphs with reference to various figures. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computing system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computing system 600 operates in conjunction with a data storage system 631, e.g., a data storage system 631 that includes a database 632 that is readily accessible by the computing system 600. The computing system 600 communicates with the data storage system 631 through a data interface 633. A data interface 633, which is coupled with the bus 606, transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for a bottom-up electronic design implementation flow and track pattern definition for multiple-patterning lithographic techniques, comprising:

identifying a canvas of a layout and one or more design rules for track patterns and multiple patterning;

inserting a first shape into the canvas by implementing the first shape with a first width along a first track in the canvas based in part or in whole upon the one or more design rules, wherein the canvas including the first shape does not correspond to base legal track patterns in a base set;

generating, at a track pattern processing and generation mechanism including or coupled with at least one micro-processor of a computing system, a custom, legal track pattern by arranging a plurality of tracks in an order and by associating at least the first width with the first track; and modifying the layout by guiding an insertion of one or more additional shapes with the custom, legal track pattern.

2. The computer implemented method of claim 1, further comprising:

generating a system region for the first shape, wherein the one or more design rules determine legality of track patterns in the layout and fabrication of the layout with multiple patterning lithographic techniques; and adding at least the first track to the system region, wherein the canvas includes zero or more existing shapes.

3. The computer implemented method of claim 2, further comprising:

determining a list of legal widths for a second shape based in part or in whole upon the first width; and identifying a second width from the list of legal widths for a second shape by selecting the second width from the list of legal width, the second shape to be inserted into the canvas.

4. The computer implemented method of claim 3, further comprising:

dynamically determining a legal space for guiding insertion of the second shape into the canvas based in part or in whole upon the first width of the first shape and the second width of the second shape.

5. The computer implemented method of claim 4, wherein the legal space defines a track pattern region between the first track and a second track for the second shape in which one or more legal solutions for at least one legal track pattern is found, and the at least one legal track pattern includes a permissible arrangement of at least the first track, the track pattern region including at least one additional track, and the second track in a permissible order.

6. The computer implemented method of claim 4, further comprising:

identifying a location for inserting the second shape by determining the location with the legal space as a guide; and determining whether or not the location is overridden by examining a final location of the second shape against the legal space.

7. The computer implemented method of claim 6, further comprising:

modifying an implementation scheme for the second shape by identifying another legal width from the list of legal widths or altering a minimum number of tracks in the custom, legal track pattern.

8. The computer implemented method of claim 6, further comprising:
incrementally implementing the second shape in the canvas by inserting the second shape having the second width at the location or the final location along a second track; and
incrementally modifying the system region by expanding the system region into an expanded system region to accommodate at least the first shape and the second shape.

9. The computer implemented method of claim 8, further comprising:
determining whether or not an arrangement of the first track, a space between the first track and the second track, and the second track matches one or more base legal track patterns in the base set; and
implementing the layout by inserting one or more additional shapes with the one or more base legal track patterns in the base set when the arrangement is determined to match the one or more base legal track patterns.

10. The computer implemented method of claim 9, further comprising:
examining the modified, custom legal track pattern by comparing one or more track pattern characteristics to one or more corresponding base legal track patterns in the base set; and
performing redundancy removal by discarding the modified, custom legal track pattern when the modified, custom legal track pattern is determined to match a base legal track pattern in the base set.

11. The computer implemented method of claim 8, further comprising:
updating the expanded system region to include the second track for the second shape in the expanded system region; and
modifying the custom, legal track pattern into an incrementally modified custom, legal track pattern by converting the expanded system region into the custom, legal track pattern or by assembling the second track into the custom, legal track pattern.

12. The computer implemented method of claim 6, further comprising:
identifying a first plurality of shapes in a first region of the layout; and
identifying one or more first characteristics of the first plurality of shapes.

13. The computer implemented method of claim 1, further comprising:
determining one or more first legal track patterns for a plurality of shapes;
examining the one or more first legal track patterns by comparing at least one of the one or more first characteristics pertaining to geometric information of the first plurality of shapes to at least one of one or more track pattern characteristics pertaining to corresponding geometric information associated with the one or more first legal track patterns along which the first plurality of shapes are implemented to determine whether or not no matching track patterns are found; and
storing at least one of the one or more first legal track patterns or exporting the at least one of the one or more first legal track patterns to a central repository for collaboration on the layout or on one or more other layouts.

14. The computer implemented method of claim 1, further comprising:
identifying the custom, legal track pattern with a track pattern identification;
associating the identification of the custom, legal track pattern with the canvas; and
dynamically modifying the track pattern identification based on a progress of implementation of the layout.

15. A system for implementing DRC (design rule check) clean multi-patterning process nodes with parallel fills in electronic designs, comprising:
a computing system including a plurality of mechanisms, at least one of which comprises or is coupled with at least one microprocessor including one or more processor cores executing one or more threads;
a non-transitory computer accessible storage medium storing thereupon program code that includes a sequence of instructions that, when executed by the at least one micro-processor or processor core, causes the at least one micro-processor or processor core at least to:
identify a canvas of a layout and one or more design rules for track patterns and multiple patterning;
insert a first shape into the canvas by implementing the first shape with a first width along a first track in the canvas based in part or in whole upon the one or more design rules, wherein the canvas including the first shape does not correspond to base legal track patterns in a base set;
generate, at a track pattern processing and generation mechanism including or coupled with the at least one micro-processor of the computing system, a custom, legal track pattern by arranging a plurality of tracks in an order and by associating at least the first width with the first track; and
modify the layout by guiding an insertion of one or more additional shapes with the custom, legal track pattern.

16. The system of claim 15, wherein the non-transitory computer accessible storage medium holds the program code, and the program code includes further instructions that, when executed by the at least one micro-processor or processor core, cause the at least one processor or processor core to:
generate a system region for the first shape, wherein the one or more design rules determine legality of track patterns in the layout and fabrication of the layout with multiple patterning lithographic techniques;
add at least the first track to the system region, wherein the canvas includes zero or more existing shapes;
determine a list of legal widths for a second shape based in part or in whole upon the first width; and
identify a second width from the list of legal widths for the second shape by selecting the second width from the list of legal width, the second shape to be inserted into the canvas.

17. The system of claim 15, wherein the non-transitory computer accessible storage medium holds the program code, and the program code includes further instructions that, when executed by the at least one processor or processor core, causes the at least one micro-processor or processor core to:
dynamically determine a legal space for guiding insertion of a second shape into the canvas based in part or in whole upon the first width of the first shape and the second width of the second shape, wherein
the legal space defines a track pattern region between the first track and a second track for the second shape in which one or more legal solutions for at least one legal track pattern is found, and the at least one legal track pattern includes a permissible arrangement of at least the first track, the track pattern region including at least one additional track, and the second track in a permissible order.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for a bottom-up electronic design implementation flow and track pattern definition for multiple-patterning lithographic techniques, the set of acts comprising:

identifying a canvas of a layout and one or more design rules for track patterns and multiple patterning;

inserting a first shape into the canvas by implementing the first shape with a first width along a first track in the canvas based in part or in whole upon the one or more design rules, wherein the canvas including the first shape does not correspond to base legal track patterns in a base set;

generating, at a track pattern processing and generation mechanism coupled with the at least one micro-processor of a computing system, a custom, legal track pattern by arranging a plurality of tracks in an order and by associating at least the first width with the first track; and modifying the layout by guiding an insertion of one or more additional shapes with the custom, legal track pattern.

19. The article of manufacture of claim 18, the set of acts further comprising:

generating a system region for the first shape, wherein the one or more design rules determine legality of track patterns in the layout and fabrication of the layout with multiple patterning lithographic techniques; and adding at least the first track to the system region, wherein the canvas includes zero or more existing shapes;

determining a list of legal widths for a second shape based in part or in whole upon the first width; and identifying a second width from the list of legal widths for the second shape by selecting the second width from the list of legal width, the second shape to be inserted into the canvas;

identifying a location for inserting the second shape by determining the location with a legal space as a guide; and determining whether or not the location is overridden by examining a final location of the second shape against the legal space.

20. The article of manufacture of claim 18, the set of acts further comprising at least one of:

modifying an implementation scheme for a second shape by identifying another legal width from the list of legal widths or altering a minimum number of tracks in the custom, legal track pattern;

incrementally implementing the second shape in the canvas by inserting the second shape having a second width at a location or a final location along a second track;

incrementally modifying a system region by expanding the system region into an expanded system region to accommodate at least the first shape and the second shape;

determining whether or not an arrangement of the first track, a space between the first track and the second track, and the second track matches one or more base legal track patterns in the base set; and implementing the layout by inserting one or more additional shapes with the one or more base legal track patterns in the base set when the arrangement is determined to match the one or more base legal track patterns.

* * * * *